US010170943B2

(12) United States Patent
Joye et al.

(10) Patent No.: US 10,170,943 B2
(45) Date of Patent: Jan. 1, 2019

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Klaas Jacob Lulofs, Eindhoven (NL); Andries Van Wageningen, Wijlre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 44 days.

(21) Appl. No.: 15/501,633

(22) PCT Filed: Aug. 19, 2015

(86) PCT No.: PCT/EP2015/068987
§ 371 (c)(1),
(2) Date: Feb. 3, 2017

(87) PCT Pub. No.: WO2016/034410
PCT Pub. Date: Mar. 10, 2016

(65) Prior Publication Data
US 2017/0229920 A1 Aug. 10, 2017

(30) Foreign Application Priority Data
Sep. 3, 2014 (EP) .................................. 14183305

(51) Int. Cl.
*H02J 50/12* (2016.01)
*H04B 5/00* (2006.01)
*H02J 7/02* (2016.01)

(52) U.S. Cl.
CPC ............. *H02J 50/12* (2016.02); *H02J 7/025* (2013.01); *H04B 5/0037* (2013.01); *H04B 5/0075* (2013.01)

(58) Field of Classification Search
CPC ...... H02J 50/12; H04B 5/0037; H04B 5/0075
See application file for complete search history.

(56) References Cited

U.S. PATENT DOCUMENTS

| 7,522,878 B2 | 4/2009 | Baarman |
| 2009/0175060 A1 | 7/2009 | Onishi et al. |
| 2012/0249097 A1 | 10/2012 | Baarman |

FOREIGN PATENT DOCUMENTS

| DE | 19544722 C1 | 4/1997 |
| WO | 9820363 A1 | 5/1998 |

OTHER PUBLICATIONS

Wireless Power Consortium, Downloaded from http://www.wirelesspowerconsortium.com/index.html on Mar. 18, 2014, 2 pages.
(Continued)

*Primary Examiner* — Robert Deberadinis

(57) ABSTRACT

A power transmitter (101) provides power transfer to a power receiver (105) using a wireless inductive power transfer signal. The power transmitter (101) comprises an inductor (103) generating the power transfer signal when a voltage drive signal is applied. A measurement unit (311) performs measurements of a current or voltage of the inductor (103). The measurements are performed with a time offset relative to a reference signal synchronized to the voltage drive signal. An adaptor (313) can vary the time offset to determine an optimum measurement timing offset resulting in a maximum demodulation depth which reflects a difference measure for measurements for different modulation loads of the power transfer signal. A demodulator (309) then demodulates load modulation of the inductive carrier signal from measurements with the time offset set to the optimum measurement timing offset. In some scenarios, both the timing and duration of measurements may be varied. The approach improves communication reliability.

14 Claims, 32 Drawing Sheets

(56) References Cited

OTHER PUBLICATIONS

Kim et al, "Frequency-Agile Load-Modulated Magnetic Resonance Wireless Power Transfer System for Reliable Near-Field In-Band Signalling", Electronics Letters, vol. 49, No. 24, Nov. 21, 2013, pp. 1558-1559.
Kim et al, "Adaptive Frequency With Power-Level Tracking System For Efficient Magnetic Resonance Wireless Power Transfer", Electronics Letters, vol. 48, No. 8, Apr. 12, 2012, pp. 1-2.
Qi System Description Wireless Power Transfer, vol. 1: Low Power, Part 1: Interface Definition, Vesion 1.1.1, 2010, 84 pages.
"Cordless Kitchen Appliances—A Powerful New Kitchen Concept", Wireless Power Consortium, White Paper, Apr. 2013, 8 pages.
Proakis et al, "Digital Communications", Fifth Edition, McGraw-Hill, Chapters 4 and 5, 2008, pp. 160-329.
Qi Systems Description, Wireless Power Tranfer, vol. I: Low Power, Part 3: Complaince Testing, Version 1.1.2, Jun. 2013, 136 pages.

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2015/068987, filed on Aug. 19, 2015, which claims the benefit of European Patent Application No. 14183305.3, filed on Sep. 3, 2014. These applications are hereby incorporated by reference herein.

FIELD OF THE INVENTION

The invention relates to inductive power transfer and in particular, but not exclusively, to a power transmitter providing inductive power transfer system using elements compatible with the Qi Specifications.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries, and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 of the Qi wireless power specification (version 1.0).

Although Qi uses a unidirectional communication link, it has been proposed to introduce communication from the power transmitter to the power receiver.

System Control

In order to control the wireless power transfer system, the Qi standard specifies a number of phases or modes that the system may be in at different times of the operation. More details can be found in chapter 5 of part 1 of the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense in order to detect a possible presence of an object. Similarly, the receiver will wait for the presence of a power signal.

Ping Phase:

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition, the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm.

However, work is ongoing to increase the available power, and in particular the standard is being extended to mid-power devices being devices having a power drain of more than 5 W. Other work is ongoing to extend the distance between the coils to e.g. 40 mm.

As mentioned, the Qi standard supports communication from the power receiver to the power transmitter, and this is used to enable the power receiver to communicate power requirements to the power transmitter which the power transmitter can then use to set characteristics of the generated power signal. Specifically, the power receiver may transmit power error control messages to the power transmitter and the power transmitter may control the transmitted power accordingly. Thus, a power control is implemented. The power transmitter is typically arranged to adjust the transmitted power by varying the duty cycle or the supply voltage to the drive circuit for the transmitter inductor, or by varying the frequency of the generated power transfer signal. As the transmitter inductor and the receiver inductor are typically part of a resonance or tank circuit, the change of frequency will also result in an overall change in the transferred power.

The communication from power receiver to power transmitter is achieved by the power receiver performing load modulation wherein a loading applied to the power receiver inductor is varied to provide a modulation of the power signal. The resulting changes in the electrical characteristics (e.g. variations in the amplitude of the current flowing through the primary coil) can be detected and demodulated by the power transmitter.

For load modulation, the power transfer signal generated from the transmitter inductor is accordingly used as a carrier signal for the load modulation introduced by the changes of the loading of the power transfer signal at the power receiver. In order to provide improved power transfer performance, it is of course necessary for the communication reliability to be as high as possible, and specifically for the bit or message error rate to be minimized. However, the load modulation performance depend on many different operating characteristics and parameters, including for example the frequency of the power transfer signal, the specific load values for different loads of the load modulation etc.

In order to optimize communication performance, it has been proposed in N. Y. Kim, S.-W. Yoon, and C.-W. Kim, "Frequency-agile load-modulated magnetic resonance wireless power transfer system for reliable near-field in-band signaling," Electronic Letters, vol. 49, no. 24, pp. 1558-1559, Nov. 21, 2013, to implement a frequency tracking system which sets the carrier signal to a frequency that optimizes a modulation depth measured as the voltage amplitude difference for different loads of the power receiver when load modulating.

However, it has been found that such an approach tends to still lead to suboptimal performance, and to result in communication errors that adversely affect power transfer performance. Furthermore, the adjustment of the power transfer signal frequency based on communication considerations is typically impractical or not feasible for an efficient power transfer system where the frequency often needs to be optimized and/or is dynamically varied to provide the desired power transfer performance and characteristics.

An improved power transfer approach would accordingly be advantageous. In particular, an approach that allows improved operation, improved power transfer, increased flexibility, facilitated implementation, facilitated operation, improved communication, reduced communication errors, especially for load modulation, improved power control and/or improved performance would be advantageous. Especially, in many scenarios it would be advantageous to enable reliable communication at an increased distance between the power receiver and power transmitter coils since the reduced coupling is likely to result in lower demodulation depth.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for providing a power transfer to a power receiver using a wireless inductive power transfer signal, the power transmitter comprising: a transmitter inductor for generating an inductive carrier signal for load modulation in response to a voltage drive signal applied to at least one of the transmitter inductor and a resonance circuit comprising the transmitter inductor; a measurement unit arranged to, for cycles of a reference signal synchronized to the voltage drive signal, perform first measurements of at least one of an inductor current and an inductor voltage for the transmitter inductor, each first measurement being over a measurement time interval being a subset of a cycle period of the reference signal and having a first time offset relative to the reference signal; an adaptor for varying the first time offset and detecting an optimum measurement timing offset for the varying first time offset resulting in a maximum demodulation depth for a demodulation depth reflecting a difference measure for first measurements for different modulation loads of the inductive carrier signal; and a demodulator for demodulating load modulation of the inductive carrier signal from first measurements with the first time offset set to the optimum measurement timing offset.

The invention may provide improved communication and/or improved power transfer. In many embodiments, it may reduce the error rate for load modulation communication from the power receiver to the power transmitter. The approach may in particular improve communication reliability for power control errors thereby resulting in a more accurate power transfer control.

The first measurements may typically be performed at least once in each cycle of the reference signal, or may e.g. in some embodiments only be performed for a subset of cycles of the reference signal.

The reference signal may be synchronized to the power transfer signal by having the same frequency and a fixed time or phase offset, and in many scenarios having a zero degree or time offset.

Modulation depth or demodulation depth may be a difference between the result of a first measurement for a first load state of the load modulation and the result of a first measurement for a second load state of the load modulation. In many embodiments, the load modulation may be performed by the receiver switching between two load states for the load modulation, such as e.g. by connecting and disconnecting a capacitor across the receive inductor of the power receiver. In such cases, the demodulation depth may be the difference in first measurements resulting from the two load states. The demodulation depth may be measured as an absolute or relative value, such as e.g. the ratio between the measurement values for the two load states. The determination of demodulation depth may include low pass filtering and/or averaging. E.g. the demodulation depth may be generated by comparing low pass filtered versions of first measurements for different load states, or may e.g. be generated by low pass filtering demodulation depth values generated from first measurements for different load states.

It will be appreciated that any difference measure for first measurements for different modulation loads of the power transfer signal may be used. The difference measure may specifically reflect a difference between average demodulation soft decision values for different modulation loads corresponding to different load modulation data symbols. In many embodiments, the difference measure may be an indication of a difference between averaged or low pass filtered value of the inductor voltage or inductor current for the different modulation loads.

A data symbol may in many embodiments correspond directly to a load state. In other embodiments, a data symbol may be formed by a sequence of load states. In some embodiments, the demodulation depth may be determined by the combined difference in measurement values for the sequence or pattern, i.e. the demodulation depth may reflect the difference in combined measured values for different data symbols.

The optimum measurement timing offset reflects/is the value of the timing offset for which the maximum demodulation depth has been determined/detected.

The demodulation of the load modulation may depend on the specific load modulation applied, and in particular may depend on whether each load state corresponds to a data symbol or whether a data symbol is represented by a plurality of load states. In many embodiments, the first measurements may be compared to expected values for possible load modulation data symbols/load states, and the load modulation data symbol/load state for which a difference measure between first measurements and the expected values is minimized may be selected.

Thus, in some embodiments, the demodulator may be arranged to compare first measurements to expected values for possible load modulation data symbols, and to determine a demodulated data symbol as the load modulation data symbol for which a difference measure between first measurements and the expected values is minimum.

The demodulator may specifically be arranged to control the measurement unit to perform the first measurements with a relative time offset equal to the optimum measurement time offset.

The adapter may be arranged to dynamically detect the optimum measurement timing offset. The adapter may be arranged to dynamically change the first time offset and detect the optimum measurement timing offset, and specifically with an update rate for the first time offset (specifically to correspond with a new detected optimum measurement timing offset) having a period of less than 10 minutes, 5 minutes, 1 minute, 10 seconds, 1 second or 0.5 seconds.

The adapter may be arranged to (dynamically) vary the first time offset and detect the optimum measurement timing offset during operation, and specifically during or simultaneously with a power transfer (from the power transmitter to the power receiver) and/or with demodulation of load modulation. The adapter may be arranged to detect a maximum demodulation depth by detecting a maximum value of a measured demodulation depth, the measured demodulation depth being determined in response to a comparison of at least one first measure for a first modulation load and at least one first measure for a second modulation load (different from the first modulation load).

The reference signal is a varying signal having variations that are synchronized to the voltage drive signal. The synchronization between the voltage drive signal and the reference signal may be there by being a fixed time offset between repetitions in the signals. The first time offset may be measured from a time instant corresponding to a given event in each cycle/repetition of the reference signal to a time instant corresponding to a given event for a first measurement. Specifically, the first time offset may be measured from a zero crossing, (e.g. absolute) minimum, or (e.g. absolute) maximum of the reference signal in a cycle to a start, midpoint or endpoint of the measurement interval.

The inductive carrier signal may provide an electromagnetic signal which can be load modulated by the power receiver such that load variations at the power receiver may cause variations in the inductor current and/or voltage for the transmitter inductor.

In some embodiments, the inductive carrier signal may be the wireless inductive power transfer signal, and may in addition to providing a carrier for load modulation also provide power to the power receiver, including to any load supported by the power receiver. In some embodiments, the inductive carrier signal and the wireless inductive power transfer signal may be different signals. In such scenarios, the wireless inductive power transfer signal may provide power for the loading of the power receiver whereas the inductive carrier signal may provide power only for the load modulation, and/or possibly for powering some or all of the control functionality of the power receiver.

In embodiments wherein the power transfer signal and the inductive carrier signal are not the same signal, the two signals may be generated by the same inductor (i.e. the transmitter inductor may be used both as a communication inductor and as a power transfer inductor). In other embodiments, the two signals may be generated by different inductors, i.e. the power transmitter (and typically the power receiver) may comprise separate power transfer and communication inductors.

The demodulator may be arranged to demodulate load modulation of the inductive carrier signal from first measurements with the first time offset set to the same optimum measurement timing offset independently of the load modulation symbol being demodulated. The optimum measurement timing offset is generally independent of the load modulation, and is not changed dependent for different modulation loads. The first time offsets used for demodulation may be the same for a plurality of different load modulation symbols.

In accordance with an optional feature of the invention, the adaptor is arranged to vary a duration of the measurement time interval to determine an optimum measurement duration resulting in a maximum demodulation depth; and the demodulator is arranged to demodulate the load modulation from first measures with a duration of the measurement time interval corresponding to the optimum measurement duration.

This may improve performance in many scenarios and embodiments. In particular, it may result in reduced bit errors in many scenarios, and/or may provide improved power transfer.

The demodulation depth may in some embodiments be normalized with respect to the duration. In many embodiments, the demodulation depth may be determined as the relative demodulation depth, such as e.g. as the ratio between low pass filtered values for the first measurements for each of different load modulation data symbols or load states.

In some embodiments, the adaptor is arranged to vary a duration of the measurement time interval to determine an optimum measurement duration resulting in a maximum signal to noise ratio; and the demodulator may be arranged to demodulate the load modulation from first measures with a duration of the measurement time interval set to this optimum measurement duration.

The adaptor may be arranged to vary a duration of the measurement time interval to determine an optimum measurement duration for the varying duration resulting in a maximum demodulation depth (for a demodulation depth reflecting a difference measure for first measurements for different modulation loads of the inductive carrier signal). The demodulator may then be arranged to demodulate the load modulation from first measures with a duration of the measurement time interval corresponding to the optimum measurement duration (specifically for which a (measured) maximum demodulation depth was detected).

The optimum measurement duration reflects/is the value of the measurement duration for which the maximum demodulation depth has been determined.

In many embodiments, each first measurement is a sampling of at least one of the inductor current and the inductor voltage.

This may in many embodiments improve performance and/or facilitate operation. The approach is for example particularly suitable for digital implementations of the demodulator and/or adaptor, such as implementation in a microcontroller or signal processor.

In many scenarios, demodulation based on optimized sampling instants with respect to the demodulation depth may provide a particularly advantageous and reliable demodulation.

In accordance with an optional feature of the invention, the adapter is arranged to implement a control loop arranged to dynamically adapt the optimum measurement timing offset in response to a measured demodulation depth determined from first measurements with first time offset of the optimum measurement timing offset.

A control loop may detect an optimum measurement timing offset by detecting a maximum of a measured demodulation depth derived from first measurements. The timing of at least some of the first measurements, i.e. the first time offset, may be set to the optimum measurement timing offset.

In the control loop, the first time offset for at least some of the first measurements used by the adapted may be determined by evaluating a measured demodulation depth determined from the first measurements.

In some embodiments, a difference signal may be determined reflecting a difference between a first measured demodulation depth derived from first measurements with a first time offset of the optimum measurement timing offset and a second measured demodulation depth derived from first measurements with a first time offset different from the optimum measurement timing offset. The optimum measurement timing offset may then be determined in response to the difference.

The first time offset for the first measurements used to determine the second demodulation depth may be varied dynamically. In some embodiments, the first time offset for the first time offset for the first measurements may have a fixed time offset relative to the optimum measurement timing offset.

The approach may allow improved performance and in particular improved communication reliability and fewer demodulation errors in many embodiments. The control loop may allow a dynamic (and often continuous) adaptation to the current operating conditions. It may thus adapt the demodulation, and specifically the timing of measurements on which demodulation is based, to dynamic changes in e.g. frequency, loading and coupling between the power transmitter and the power receiver.

In accordance with an optional feature of the invention, the first measurements are of the inductor current, and the measurement unit is further arranged to, for cycles of the reference signal, perform second measurements of the inductor voltage, each second measure being in a second measurement time interval being a subset of the cycle period of the reference signal and having a second time offset relative to the reference signal; the adaptor is arranged to vary the second time offset to determine a second optimum measurement timing offset resulting in a second maximum demodulation depth for a demodulation depth reflecting a difference measure for second measurements for different modulation loads of the inductive carrier signal; and the demodulator is arranged to demodulate the load modulation based on second measurements with the second time offset set to the second optimum measurement timing offset.

This may provide a substantially more accurate and reliable load modulation communication in many embodiments, and may in particular reduce bit error rates for e.g. power control error messages thereby improving power transfer adaptation and operation.

Individual timing control and optimization for voltage and inductor current measurements provide a more accurate demodulation and is based on the Inventors' realization that the temporal characteristics for demodulation depth vary substantially for inductor currents and inductor voltages.

It will be appreciated that any difference measure for second measurements for different modulation loads of the power transfer signal may be used. The difference measure may specifically reflect a difference between average demodulation soft decision values for different modulation loads corresponding to different load modulation data symbols. In many embodiments, the difference measure may be an indication of a difference between averaged or low pass filtered value of the inductor voltage for the different modulation loads.

In accordance with an optional feature of the invention, the measurement unit is arranged to generate first measurements of the inductor current and the inductor voltage with different time offsets relative to the reference signal, and the demodulator is arranged to demodulate the load modulation from both measurements of the inductor current and the inductor voltage.

This may provide a substantially more accurate and reliable load modulation communication in many embodiments, and may in particular reduce bit error rates for e.g. power control error messages thereby improving power transfer adaptation and operation.

Individual timing control and optimization for voltage and inductor current measurements provide a more accurate demodulation and is based on the Inventors' realization that the temporal characteristics for demodulation depth vary substantially for inductor currents and inductor voltages.

In accordance with an optional feature of the invention, the reference signal is one of the voltage drive signal and a drive signal for a switch circuit generating the voltage drive signal.

This may provide improved performance and/or improved implementation in many embodiments.

The reference signal may be a switch signal which controls switching of a drive circuit, such as an inverter, such as to generate the inductor drive signal. Specifically, the reference/drive signal may be a drive signal provided to a switch circuit generating a voltage signal for the transmitter inductor which has the same phase and frequency as the switch circuit.

In some embodiments, the reference signal may be the voltage signal of the inductor. The reference signal may have the same frequency and phase as the voltage signal of the inductor.

In accordance with an optional feature of the invention, the inductive carrier signal is the power transfer signal.

This may provide improved and/or simplified operation in many scenarios.

In accordance with an optional feature of the invention, the power transmitter further comprises a power transfer adapter arranged to select a frequency of the power transfer signal based on a power transfer property.

This may substantially improve power transfer in many embodiments, and may specifically allow power transfer optimization and/or power transfer adaptation. The approach of a frequency of the power transfer signal being dependent on power transfer characteristics may preclude the optimization of the frequency for communication purposes, and may result in uncertainty of the operating frequency and thus the specific characteristics of the power transfer signal when used as a carrier for load modulation. The described approach mitigates and compensates for this by adjusting the relative timing and phase between the power transfer signal and the measurements for load modulation demodulation such that these may be optimized for the specific frequency currently selected by the system.

The approach may provide adaptation to both desired power transfer and communication setups.

In accordance with an optional feature of the invention, the power transfer adapter is arranged to vary the frequency of the power transfer signal in response to power control messages received from the power receiver.

The approach may substantially improve performance in systems wherein the power of the power transfer signal is varied in response to power control messages from the power receiver. In such systems, the frequency may vary and the load modulation timing characteristics may as a result also vary substantially. Accordingly, the adaption, and specifically a dynamic adaptation, of the timing of the measurements used for demodulation of load modulation may improve communication.

In accordance with an optional feature of the invention, the power transfer adapter is arranged to initiate a determination of the optimum measurement timing offset in response to a change of the frequency of the inductive carrier signal.

This may allow improved performance and e.g. allow the power transfer power control to operate without being compromised by communication requirements, while allowing the communication performance to be dynamically adapted and optimized. The optimization and adaptation is focused on situations where characteristics may be considered to be most likely to change thereby allowing for efficient adaptation while keeping complexity and resource requirements low.

In accordance with an optional feature of the invention, the measurement unit is arranged to, for each first measurement, perform within the same cycle of the reference signal, a second measurement of at least one of the inductor current and the inductor voltage, the second measurement being in measurement time intervals having a timing corresponding to the measurement time intervals for the first measurements but with a time offset half shifted by half the cycle period offset relative to the measurement time intervals of the first measurements; and the demodulator is arranged to demodulate the load modulation from both the first measurements and the second measurements.

This may provide a particularly efficient operation and/or reliable communication in many embodiments.

In some embodiments, a duration of the measurement time interval does not exceed half a time/cycle period of the reference signal. This may provide improved performance in many embodiments.

In accordance with an optional feature of the invention, the first measurements are of the inductor current of the transmitter inductor.

This may provide improved performance in many embodiments. In particular, it may allow adaptation of the inductor current load modulation measurements to a reference signal which is synchronized to a voltage drive signal for the transmitter inductor thereby allowing the system to adapt to phase variations between these as dependent on the load modulation load states.

In accordance with an optional feature of the invention, the first measurements are of the inductor voltage of the transmitter inductor.

This may provide improved performance in many embodiments. In particular, it may allow adaptation of the inductor voltage load modulation measurements to a reference signal which is synchronized to a voltage drive signal for the transmitter inductor thereby allowing the system to adapt to phase variations between these as dependent on the load modulation load states.

In accordance with an optional feature of the invention, the adapter is arranged to initiate a determination of the optimum measurement timing offset in response to a detection of a change in a loading of the inductive carrier signal.

This may allow improved performance and may in particular in many embodiments improve communication reliability. The optimization and adaptation may in this way be focused on situations where characteristics may be considered to be most likely to change thereby allowing for efficient adaptation while keeping complexity and resource requirements low. When the loading of the power signal changes, the load modulation timing characteristics may change substantially. Accordingly, the adaption, and specifically a dynamic adaptation, of the timing of the measurements used for demodulation of load modulation may improve communication.

In accordance with an optional feature of the invention, the adapter is arranged to initiate a determination of the optimum measurement timing offset in response to a detection of a change in a coupling between the power transmitter and the power receiver.

This may allow improved performance and may in particular in many embodiments improve communication reliability. The optimization and adaptation may in this way be focused on situations where characteristics may be considered to be most likely to change thereby allowing for efficient adaptation while keeping complexity and resource requirements low. When the coupling between power transmitter and power receiver changes, the load modulation timing characteristics may change substantially. Accordingly, the adaption, and specifically a dynamic adaptation, of the timing of the measurements used for demodulation of load modulation may improve communication According to an aspect of the invention there is provided a method of operation for a power transmitter arranged to provide a power transfer to a power receiver using a wireless inductive power transfer signal, the method comprising: a transmitter inductor generating an inductive carrier signal for load modulation in response to a voltage drive signal applied to at least one of the transmitter inductor and a resonance circuit comprising the transmitter inductor; for cycles of a reference signal synchronized to the voltage drive signal, performing first measurements of at least one of an inductor current and an inductor voltage for the transmitter inductor, each first measurement being over a measurement time interval being a subset of a cycle period of the reference signal and having a first time offset relative to the reference signal; varying the first time offset and detecting an optimum measurement timing offset for the varying first time offset resulting in a maximum demodulation depth for a demodulation depth reflecting a difference measure for first measurements for different modulation loads of the inductive carrier signal; and demodulating load modulation of the inductive carrier signal from first measurements with the first time offset set to the optimum measurement timing offset.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach similar to the Qi specification. However, it will be appreciated that the invention is not limited to this application but may be applied to many other wireless power transfer systems.

In the Qi Specification, communication from the power receiver to the power transmitter is generally performed by the power receiver load modulating the power transfer signal. Accordingly, the following description will focus on an example where load modulation is of the power transfer signal, and thus wherein the power transfer signal is also used as an inductive carrier signal for load modulation. Thus, in the example, the demodulation of the data communicated by load modulation from the power receiver is by measuring changes in the resulting changes in the voltage and/or currents of the inductor generating the power transfer signal.

However, it will be appreciated that in other embodiments, the inductive carrier signal used for load modulation may be different from the power transfer signal used for transferring power to the power receiver. For example, in some embodiments, the power transmitter may comprise a power transfer inductor that generates a power transfer signal that provides power to the power receiver, and a separate communication inductor that generates an inductive carrier signal which can be used by the power receiver for load modulation. In this example, the demodulation of the data communicated by load modulation from the power receiver is from measurements of the resulting changes in the voltage and/or current of the communication inductor.

Figure 1:
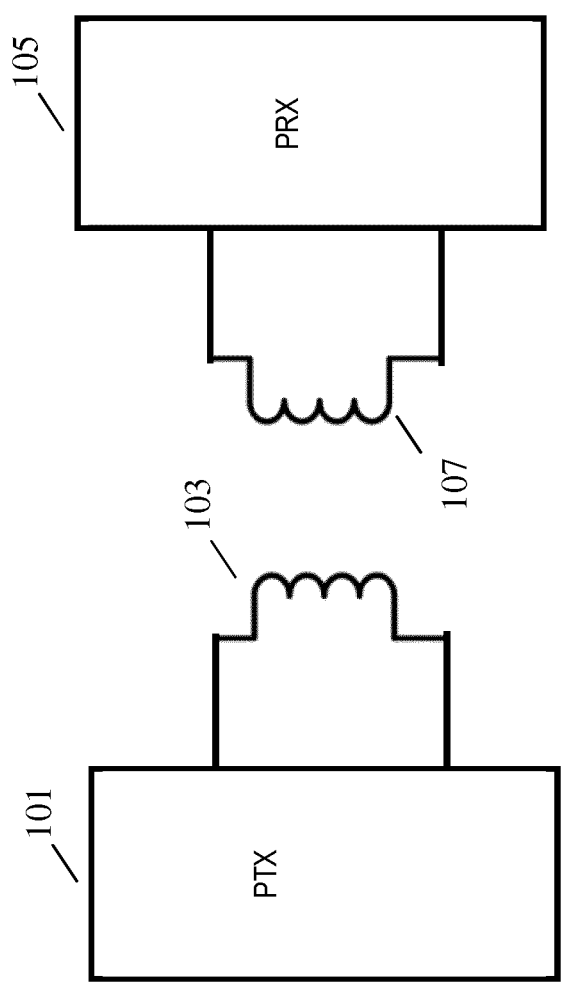
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a wireless inductive power signal (also for brevity referred to as a power signal or an inductive power signal), which is propagated as a magnetic flux by the transmitter coil 103. The power signal may typically have a frequency between around 20 kHz to 200 kHz. The transmitter coil 103 and the receiver inductor/coil 107 are loosely coupled and thus the receiver inductor 107 picks-up (at least part of) the power signal from the power transmitter 101. Thus, the power is transferred from the power transmitter 101 to the power receiver 105 using a wireless inductive coupling from the transmitter coil 103 to the receiver coil 107. The term power signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

In the example, the power transfer signal has multiple functions in that it not only provides power to the power receiver (and to any load supported by the power receiver) but also functions as an inductive carrier signal for load modulation.

In the system of FIG. 1, a magnetic field is generated by the transmitter coil 103 and the receiver coils 107 is within this magnetic field. Thus, the variations in the magnetic flux introduced by the transmitter coil 103 result in a current being induced in the receiver coil 107 whereby power is transferred.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 105 may substantially be compatible with the Qi Specification version 1.0 or 1.1 (except for the herein described (or consequential) modifications and enhancements).

Figure 2:
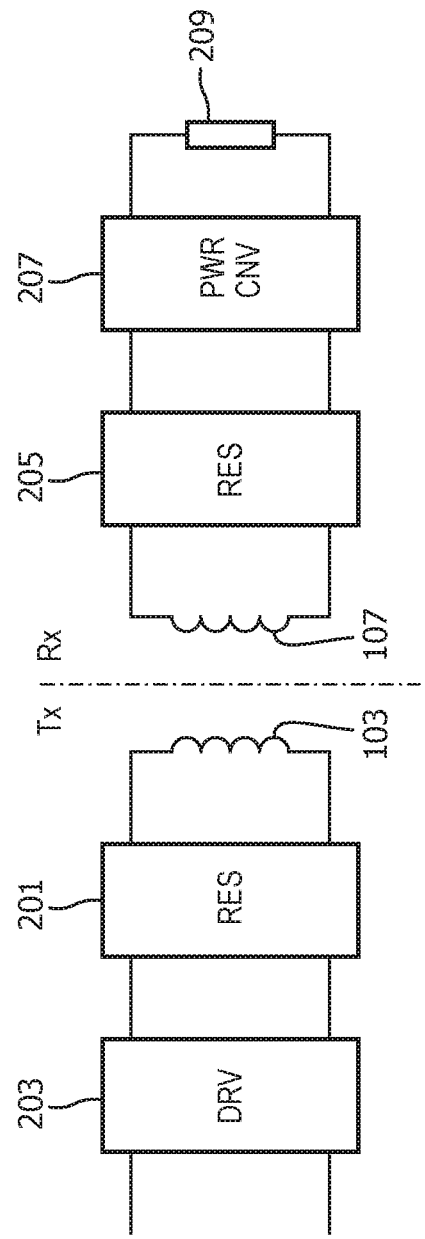
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance circuit or resonance tank 201 which includes the transmitter inductor 103 (in FIG. 2, the transmitter inductor 103 is for clarity shown external to the resonance circuit 201 but is considered to be part of this). The resonance circuit 201 may typically be a serial or parallel resonance circuit, and may in particular consist in a resonance capacitor coupled in parallel (or in series) to the transmitter inductor 103. The power transfer signal is generated by driving the output resonance circuit from a driver 203 generating a drive signal with a suitable frequency (typically in the 20-200 kHz frequency range).

Similarly, the input circuit of the power receiver 105 includes a resonance circuit or resonance tank 205 which includes the receiver inductor 107 (in FIG. 2, the receiver inductor 107 is for clarity shown external to the resonance circuit 205 but is considered to be part of this). The resonance circuit 205 may typically be a serial parallel resonance circuit, and may in particular consist in a resonance capacitor coupled in parallel (or series) to the receiver inductor 107. The resonance circuit 205 is coupled to a power converter 207 which converts the received power transfer signal, i.e. the induced signal provided by the receiver resonance circuit 205, into a power that is provided to an external load 209 (typically by performing AC/DC conversion as will be well known to the skilled person). Typically, the two resonance circuits 201, 205 have resonance frequencies close to each other in order to achieve sufficient signal amplitude at the power receiver 105.

To control the power transfer, the system may proceed via different phases, in particular a selection phase, a ping phase, identification and configuration phase, and a power transfer phase. More information can be found in chapter 5 of part 1 of the Qi wireless power specification.

For example, when setting up communication with the first power receiver 105, the power transmitter 101 may initially be in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 105 can apply the received signal to power up its electronics. After receiving the power signal, the power receiver 105 communicates an initial packet to the power transmitter 101. Specifically, a signal strength packet indicating the degree of coupling between the power transmitter 101 and the power receiver 105 is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

Thus, in order to prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On the physical level, the communication channel from the power receiver 105 to the power transmitter 101 is implemented by using the wireless inductive power signal as a wireless inductive carrier. The power receiver 105 transmits data messages by modulating the load of the receiver coil 107. This results in corresponding variations in the power signal at the power transmitter side. The load modulation may be detected by a change in the amplitude and/or phase of the transmitter coil current, or alternatively or additional by a change in the voltage of the transmitter coil 103. Based on this principle, the power receiver 105 can modulate data which the power transmitter 101 can then demodulate. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

In the example, the power transfer signal is accordingly also an inductive carrier signal for load modulation. However, it will be appreciated that in other embodiments, power transfer and load modulation may be separated and e.g. may be based on different inductive/electromagnetic signals generated by separate inductors.

In the following example where the power transfer signal is also used for load modulation, the power transfer signal is accordingly also an inductive carrier signal for load modulation. However, for brevity and clarity, the signal will be referred to as the power transfer signal.

In the arrangement of FIG. 1, the power receiver 105 thus load modulates the wireless inductive power transfer signal. The power receiver 105 may for example do this by connecting and disconnecting a capacitor coupled in parallel to the receive coil 107 thereby changing the resonance, and thus load characteristics of the power receiver 105. These changes result in changes in the inductor current and voltage of the transmitter inductor 103 and these changes are detected by the power transmitter 101 and used to demodulate the load modulation data from the power receiver 105.

The load modulation is specifically used to adapt the power transfer, and in particular to implement a power control loop that continuously adapts the transmitted power level based on power control messages received from the power receiver 105 by load modulation.

In this way, the power transmitter 101 may be arranged to adapt the power it transmits to the power receiver 105 depending on external parameters such as the coupling between the receiver and transmitter coils 103, 107 etc. In many embodiments, this adaptation may be performed by modifying the operating frequency of the power transfer signal. For example, by moving the operating frequency further away from the resonance frequencies of the resonance circuits 201, 205, the power received by the power receiver 105 is reduced, and moving the operating frequency closer to the resonance frequencies of the resonance circuits 201, 205, the power received by the power receiver 105 is increased.

In order to achieve efficient performance it is important to provide high performance load modulation communication from the power receiver 105 to the power transmitter 101. However, in conventional power transfer systems, the communication tends to be suboptimal in some scenarios and situations leading to increased communication errors and suboptimal power transfer performance. This becomes especially relevant when the coupling between power transmitter and power receiver is low.

Figure 3:
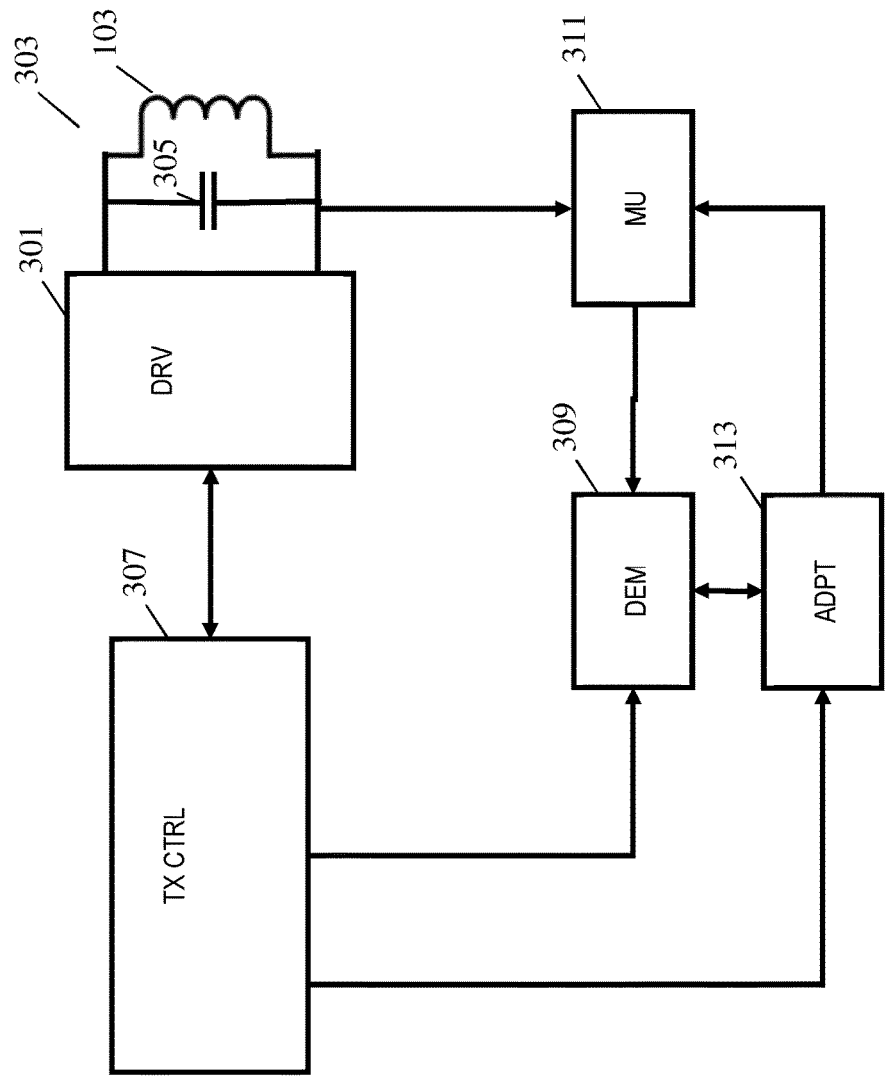
FIG. 3 illustrates an example of elements of a power transmitter in accordance with some embodiments of the invention.

FIG. 3 illustrates some exemplary elements of the power transmitter 101 of FIG. 1. The power transmitter 101 includes functionality for improving communication performance and specifically for adapting the communication and demodulation operation to the current characteristics FIG. 3 illustrates a driver 301 which is coupled to a transmit resonance circuit 303 comprising the transmit coil 103 and a resonance capacitor 305. The driver 301 generates a varying and typically AC voltage drive signal which is applied to the resonance capacitor 305 and transmitter coil 103. In other embodiments, the transmit resonance circuit 303 may be a series resonance circuit, and the voltage drive signal may be applied across the capacitor and inductor (thereby also providing a drive signal to the transmitter coil 103). In some embodiments, the driver may be coupled directly (or indirectly) to the transmit coil 103 and the voltage drive signal may be provided to the transmit coil 103 (this may be the case both for embodiments wherein the transmit coil 103 is part of a resonance circuit and for embodiments where it is not (such as e.g. a single transmit coil 103 being coupled directly to the driver 301 without any other components being part of the output circuit)).

Thus, in the system, the driver 301 generates a voltage drive signal which is fed to the transmit resonance circuit 303/transmit coil 103, causing the transmit coil 103 to generate the power transfer signal providing power to the power receiver 105.

Figure 4:
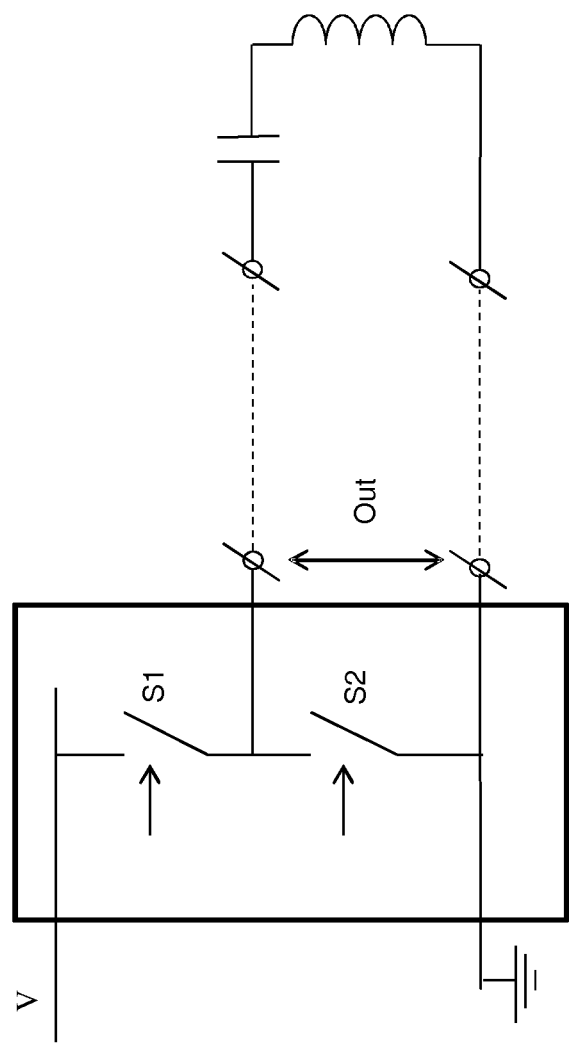
FIG. 4 illustrates an example of elements of a half-bridge inverter for a power transmitter in accordance with some embodiments of the invention.
Figure 5:
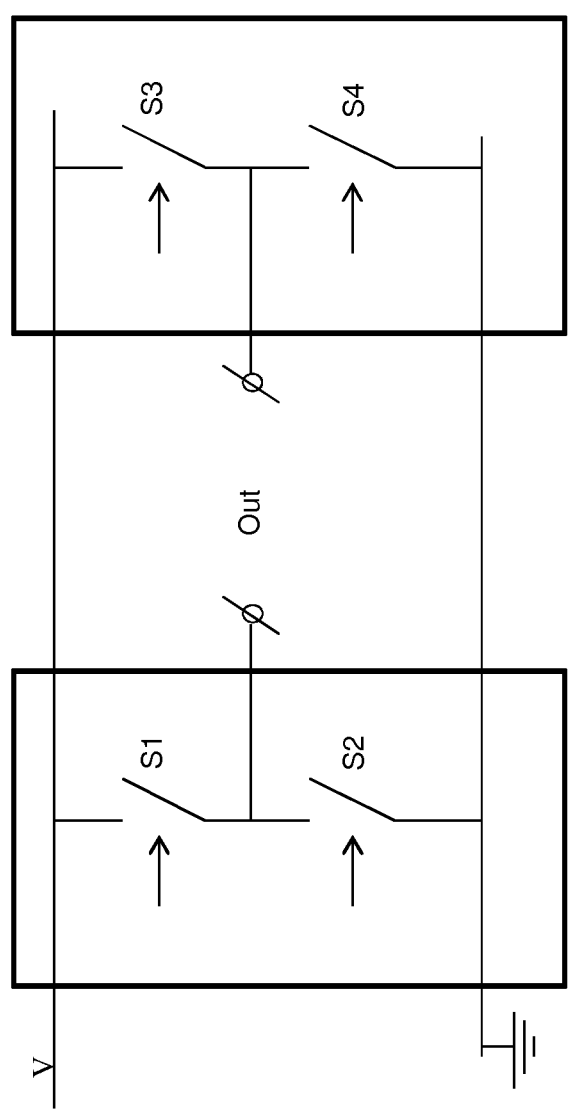
FIG. 5 illustrates an example of elements of a full-bridge inverter for a power transmitter in accordance with some embodiments of the invention.

The driver 301 generates the current and voltage which is fed to the transmitter coil 103. The driver 301 is typically a drive circuit in the form of an inverter which generates an alternating signal from a DC Voltage. FIG. 4 shows a half-bridge inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 5 shows a full-bridge inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a block-wave signal at the output. The switches are open and closed with the desired frequency.

The driver 301 is coupled to a transmitter controller 307 which comprises control functionality for operating the power transfer function, and which may specifically comprise a controller arranged to operate the power transmitter 101 in accordance with the Qi Specification as appropriate. For example, the transmitter controller 307 may be arranged to control the power transmitter 101 to perform the different Qi phases, including the Identification and Configuration phase and the power transfer phase.

In the example, the power transmitter 101 comprises a single transmitter coil 103 which is driven by the driver 301. Thus, the wireless inductive power signal is generated by a single transmitter coil 103. However, it will be appreciated that in other embodiments, the wireless inductive power signal may be generated by a plurality of transmitter coils driven e.g. in parallel by the driver. Specifically, multiple transmitter coils driven by corresponding (dependent) output signals of the driver 301 may be used to generate the wireless inductive power signal. For example, two transmitter coils may be positioned at different positions to provide two charging points for two power receivers. The two coils may be fed the same output signal from the driver 301. This may allow an improved distribution of the wireless inductive power signal/magnetic field in order to support multiple charging points.

The power transmitter 101 further comprises a demodulator 309 which is arranged to receive data messages from the power receiver 105. Specifically, the demodulator 309 is arranged to demodulate load modulation of the wireless inductive power signal to determine the corresponding data transmitted from the power receiver 105.

The demodulator 309 is arranged to demodulate the load modulation by detecting variations of the current through the transmitter coil 103 and/or the voltage over the transmit coil 103.

Accordingly, the demodulator 309 is coupled to a measurement unit 311 which is arranged to measure at least one of the inductor current through the transmitter coil 103 and the inductor voltage across the transmitter coil 103.

In some embodiments, inductor current and/or voltage may be determined indirectly, such as e.g. by measuring the supply current variations to the inverter of the driver 301 etc. However, in the specific example, the inductor current/voltage is determined by directly sensing the inductor current or voltage.

The following description will focus on the detection and demodulation based on the inductor current, but it will be appreciated that the detection and demodulation may alternatively or additionally be based on the voltage of the transmit coil 103.

The measurement unit 311 is arranged to perform measurements (also referred to as first measurements) of at least one of an inductor current and an inductor voltage for the transmitter inductor 103. The measurements are performed as a sampling of the inductor current and/or voltage, or may in some embodiments be performed over longer time intervals. The following description will first focus on examples wherein the measurements correspond to sampling of the inductor current and/or voltage.

The measurements are synchronized to the voltage drive signal. The wireless power transfer signal is (inherently) synchronized to the drive signal from the driver. Similarly, the wireless power transfer signal and the voltage drive signal are (inherently) synchronized to the switching drive signal provided to the driver 301. Thus, the measurements are synchronized to the power transfer signal, the drive signal and to the switch drive signal.

The measurement unit 311 is arranged to perform measurements of the inductor current/voltage with a time offset relative to a reference signal which is synchronized to the voltage drive signal, and thus it is also synchronized to the switch drive signal and the power transfer signal. The reference signal will have the same frequency as the drive signal and a fixed time or phase offset relative to this. Indeed, the time or phase offset may be zero, and indeed the reference signal may be the drive signal or the switch drive signal itself, or may e.g. be generated from one of these. Thus, a separate reference signal need not be generated.

Then measurements are synchronized to the reference signal by having a relative time offset or equivalently a phase offset relative to this (the terms time offset and phase offset will be considered equivalent in accordance with standard use in the field, although it is noted that direct correspondence is only applicable when considering a single frequency).

The timing offset may be measured from a point in the cycle of the reference signal to a point in the measurement interval, such as from a minimum, maximum, positive zero crossing, or negative zero crossing to a start, middle or end of a measurement time interval in the same cycle. It will be appreciate that the specific approach for measuring the time offset may vary between different embodiments, and that the any suitable approach may be used without detracting from the invention.

The measurement unit 311 is arranged to perform the first measurements for cycles of the reference signal (and thus for cycles of the drive signal or the switch drive signal). Each measurement may, as mentioned, be a single sample or may be a measurement over a longer time interval. However, the measurement time interval for each measurement does not exceed a time period or cycle time/duration of the reference signal (or the drive signal or switch drive signal).

In many embodiments, the measurement unit 311 may be arranged to generate a measurement for each cycle of the reference signal. However, it will be appreciated that in some embodiments, measurements will only be performed for a subset of cycles, such as e.g. only every second or third cycle.

The measurement unit 311 generates measurements which are dependent on/reflect the inductor current/voltage. As this value is dependent on the load of the power transfer signal by the power receiver 105, the load changes introduced by the load modulation will be reflected in the measurements. The measurements are accordingly fed to the demodulator 309 which proceeds to demodulate the load modulation data based on these. Specifically, the demodulator may average the measurements over a data symbol period and depending on the averaged value decide which load states are present, and thus which data is being received.

In the system, the measurements are not merely a random measurement of the general amplitude of the inductor current/voltage. Rather, the measurements are synchronized measurements that only consider a subset of a time period/cycle time for the reference signal, and the power transfer signal. Thus, rather than a simple amplitude or peak detection, the measurements consider only the conditions for a subset of the time period. Furthermore, the specific time interval considered is controlled by a relative time offset to the reference signal.

The power transmitter 101 of FIG. 3 further comprises an adapter 313 which is arranged to determine and set the relative time offset between the reference signal and the measurements. Accordingly, it is arranged to (typically) dynamically adapt which part of a cycle of the power transfer signal is used for demodulation, and specifically to adapt in which time interval the inductor current/voltage is considered for the purpose of demodulating the load modulation from the power receiver 101.

This consideration of the inductor current/voltage in only a dynamically adapted/selected subset of the time period allows improved demodulation with reduced error rates. Indeed, the adaptor 313 is arranged to determine the relative time offset of the measurements such that these result in a maximum demodulation depth.

The adapter 313 is arranged to vary the relative time offset, also referred to as the first time offset and to set this to correspond to an optimum measurement timing offset which corresponds to maximum demodulation depth.

The demodulation depth reflects the measurement difference between measurements for different modulation loads of the power transfer signal. Thus, for a given relative time offset, the measurement unit 311 will tend to measure a first value when the power receiver is applying one load state and a second value when the power receiver applies a second load state (the different load states e.g. corresponding to a load capacitor being respectively connected or disconnected). The first and second values will tend to be different, and it is this difference which allows the load modulation to be differentiated by the demodulator 309. The difference in values resulting from the measurements (e.g. with some post-processing such as filtering or averaging) and used for the demodulation by the demodulator 309 represents the demodulation depth or difference. The larger the difference, the larger the demodulation depth.

However, the difference between the measurements, and thus the demodulation depth, may depend on the part of the cycle in which the inductor current/voltage is considered. In the system of FIG. 3, the adaptor 313 is arranged to vary the relative time offset, also referred to as the first time offset, between the reference signal and the measurements, i.e. it can vary when in the cycle the inductor current/voltage is measured. Furthermore, the adapter 313 detects when the demodulation depth is highest, specifically it can determine when the difference between two load states is maximum. The corresponding time offset is considered an optimum measurement timing offset as it results in a maximum demodulation depth. The adapter 313 may determine this optimum measurement timing offset and feed it back to the measurement unit 311 and/or the demodulator 309 which will then proceed to generate first measurements with this relative time offset and to demodulate the load modulation based on synchronized time measurements resulting in the maximum demodulation depth, and thus the maximum differentiation between the measurements for different load states.

The adapter 313 is thus arranged to vary the first time offset such that this is set to correspond to an optimum measurement timing offset which corresponds to maximum demodulation depth. The adapter 313 can vary the first time offset and continuously determine/measure the demodulation depth for different values of the first time offset. It can then detect the time offset for which the demodulation depth is maximum. The time offset used for the demodulation is then set to this time offset. The adapter 313 is arranged to dynamically vary the first time offset to determine the optimum measurement timing offset for which the maximum demodulation depth is detected. Thus, the adapter 313 may dynamically, and in many embodiments continuously, adapt the timing of the measurements used for load demodulation such that this is adapted to the specific conditions currently experienced. For example, the adapter 313 may dynamically adapt the measurement timing offset (the first time offset) during power transfer. Accordingly, it may adapt to the specific loading, frequency, or coupling between the power receiver and the power transmitter.

As an example, the measurement unit 311 may slowly sweep the timing offset from being zero to being equal to a full time period for the reference signal. During this sweep, the power receiver 105 may be set to one load modulation load state, such as for example with a load modulation capacitor connected. The measurement unit 311 may make measurements for different timing offsets. The process may then be repeated but this time with the power receiver 105 set to another load modulation load state, such as for example with a load modulation capacitor being disconnected. The measurement unit 311 may again make measurements for different timing offsets. For each timing offset, a demodulation depth may be determined by subtracting the measurement values for the first sweep and the second sweep. The optimum timing offset may then be set to the value for which the highest demodulation depth was found. This value may then be used subsequently for generating measurements for demodulation of the load modulation.

As another example, the measurement unit 311 may slowly sweep the timing offset from being zero to being equal to a full time period for the reference signal while the power receiver 105 is modulating the load. During the sweep, the adapter 313 may determine at which timing offset, the demodulation depth is optimal.

As another example, the measurement unit 311 may choose an initial timing offset and move the offset reference signal in one direction while the power receiver 105 is modulating the load. While moving the offset, the adapter 313 determines whether the demodulation depth is increasing or decreasing. As long as the demodulation depth increases, the measurement unit 311 continues to move in the same direction. When the demodulation depth decreases, the measurement unit 311 changes the direction at which the offset is moving. This allows a continuous adaptation of the offset towards maximum demodulation depth according to changing conditions (like the frequency, load and coupling).

Thus, specifically, the adapter 313 may implement a control loop arranged to dynamically adapt the optimum measurement timing offset by varying the first time offset in response to a measured demodulation depth. Specifically, the adapter 313 may calculate a demodulation depth measure by dynamically, and in many embodiments substantially continuously, comparing measurements corresponding to different modulation loads. For example, the adapter 313 may calculate the difference between first measurements for two different modulation loads and use the difference as a demodulation depth measure (of course more complex difference measures, such as e.g. filtered or weighted values, may be used in different embodiments). In many embodiments, the difference may be filtered may a low pass filter with suitable characteristics.

The adapter 313 may then detect variations in the (filtered) demodulation depth measure. If the demodulation depth measure begins to reduce, the adaptor 811 may increase (or reduce) the first time offset and detect whether this results in an increase in the demodulation depth. If so, it may proceed to increase (or reduce) the first time offset until a maximum demodulation depth is detected, i.e. until the demodulation depth measure begins to reduce again. If the initial increase (or reduction) in the first time offset instead results in the demodulation depth measure reducing further, the adaptor 811 may proceed to change the first time offset in the other direction, i.e. it may proceed to reduce (or increase) the first time offset until this results in a maximum demodulation depth measure.

In some embodiments, the adapter 313 may be arranged to continuously jitter the first time offset. Thus, the first time offset may continuously be changed slightly and it may be detected if this results in an increased demodulation depth. If so, the new first time offset value is set as the current optimum measurement timing offset. If not, the optimum measurement timing offset is kept at the previous value. The jittering of the first time offset may be in different directions (i.e. sometimes slightly increasing the first time offset and sometimes slightly reducing it).

The adapter 313 may accordingly implement a control loop power transmitter of claim 1 wherein the adapter 313 is arranged to determine the demodulation depth in response to a comparison of first measurements for a first modulation load and first measurements for a second modulation load. The control loop is thus based on a measured demodulation depth determined from first measurements for different modulation loads.

The adapter 313 can perform these measurements and operate the control loop during a power transfer operation, and specifically during a power transfer phase. It accordingly provides a continuous adaptation to current conditions and characteristics and allows the system to provide improved communication performance which adapts to the changes in the use scenarios. In particular, the Inventors have realized that the communication performance and the timing characteristics depend on dynamic properties that vary during operation. In particular, the Inventors have realized that the optimum measurement times and durations are not static but depends on dynamically changing properties, such as the frequency and loading of the power transfer signal, or the coupling between the power receiver and the power transmitter.

By dynamically adapting the timing offset for the measurements used to perform the demodulation during the operation, and specifically during a power transfer phase, improved communication is achieved. Implementing an automatic control loop which adapts the timing can provide a system which flexibly and dynamically adapts the timing of the measurements. The adaptation can be performed during operation and specifically during power transfer as well as during demodulation. Thus, the adapter 313 can adapt the timing offset simultaneously with demodulation being performed. Specifically, the same measurements that are used for demodulation may also be used by the adapter 313 to adapt the timing offset. In many embodiments, the measurements (the first measurements) that are used to demodulate the load modulation are also used to generate the demodulation depth measure which is used to drive the control loop.

It will be appreciated that other approaches for implementing a control loop which drives the first time offset towards an optimum measurement timing offset based on a measured demodulation depth may be used. Specifically, the adapter 313 may implement any algorithm which in response to a measured demodulation depth drives the first time offset to result in a maximum demodulation depth. Thus, since the measured demodulation depth is dependent on the first time offset, this will result in a control loop which dynamically can drive the timing offset for the measurements used for demodulation. The control loop can further automatically optimize the timing offset, and thus the timing of the measurements used for demodulation, for the current conditions. Indeed, in many embodiments, this can be achieved without the control loop considering any of the specific characteristics affecting the optimum timing instants. For example, the loop does not need to detect or estimate the power transfer load or the coupling between the power receiver and power transmitter, yet the operation of the control loop will still adapt the timing offset to reflect changes in such parameters.

Thus, in contrast to e.g. approaches where a fixed predetermined (e.g. determined during design or manufacture) timing is used for the measurements (or e.g. a simple predetermined peak detection is used), the system can provide a substantially improved communication performance. Indeed, as illustrated later, using predetermined values may provide acceptable performance in some scenarios but will tend to result in less than optimum communication performance in other scenarios. For example, a power transmitter may be used with a range of power receivers with different characteristics, such as e.g. with different loads, different positions of inductors etc. The described system may automatically adapt to the different power receivers to provide performance optimized for the specific power receiver currently used. Using a predetermined timing offset (or e.g. two predetermined timing offsets) cannot provide such optimization and thus demodulation will inherently be based on reduced demodulation depth in many scenarios. Similarly, using a simple peak detection will result in reduced demodulation depth, and indeed may in some scenarios result in substantially no demodulation depth and thus a very high demodulation error rate (such as e.g. in the example of FIG. 8).

In many embodiments, all first measurements are performed at the current value of the optimum measurement timing offset, and the value of the optimum measurement timing offset is dynamically modified to reflect changes in the timing offset resulting in the maximum demodulation depth. Further, in many such embodiments, all the first measurements used by the adapter to determine the optimum measurement timing offset may also be used for demodulation.

However, in other embodiments, only some of the first measurements may be made for the current value of the optimum measurement timing offset. For example, some first measurements may be performed with a time offset corresponding to the current value of the optimum measurement timing offset. These measurements may specifically be used for demodulation. However, in addition, some of the first measurements may be performed for a first time offset (or time offsets) which do not correspond to the current value of the optimum measurement timing offset. Rather, these measurements may be performed with a different time offset, henceforth referred to as a test time offset. The adapter may determine a demodulation depth for the test time offset which is henceforth referred to as a test demodulation depth.

The adapter may then generate a difference measure reflecting the difference between the test demodulation depth and the demodulation depth for the optimum measurement timing offset. If indeed the optimum measurement timing offset corresponds to the maximum demodulation depth, the test demodulation depth will be lower. However, if it is detected that the test demodulation depth is higher than the demodulation depth for the optimum measurement timing offset, it is determined that the test demodulation depth now reflects the maximum demodulation depth and accordingly the adapter changes the value of the optimum measurement timing offset to correspond to the test timing offset.

Thus, when it is detected that a demodulation depth is measured which is higher than the currently perceived maximum demodulation depth, the system adapts to make the test time offset for this demodulation depth the new optimum measurement timing offset. Thus, a new setting of the optimum measurement timing offset is determined based on a control loop which as an input has a demodulation depth for the current optimum measurement timing offset.

It will be appreciated that in some embodiments, the change of the optimum measurement timing offset may be subject to various criteria and requirements. For example, it may be required that the difference in the demodulation depths is higher than a given value, has been higher for a given length of time etc. It will also be appreciated that the difference between the demodulation depths may be filtered as part of the evaluation.

In some embodiments, the system may utilize a fixed timing offset between the optimum measurement timing offset and the test timing offset. In other embodiments, a dynamically changing offset may exist. For example, in some embodiments, the adaptor may be arranged to vary the test timing offset e.g. to scan over a given range. The highest determined value of the demodulation depth may be detected and this may then be compared to the demodulation depth for the current optimum measurement timing offset.

It will also be appreciated that in many embodiments, more than one test timing offset may be used. For example, the adapter may continuously calculate demodulation depth based on measurements with a timing offset that are a little bit before the optimum measurement timing offset and a little bit after the optimum measurement timing offset. This may provide a symmetric adaptation of the optimum measurement timing offset and may specifically adapt this to continuously converge towards the maximum demodulation depth. In some embodiments, the measured demodulation depth difference may be used as an error signal for a control loop setting the optimum measurement timing offset. For example, if the difference measure is positive corresponding to the demodulation depth for the current optimum measurement timing offset being higher than the demodulation depth, the error signal is set to zero. However, if the difference is negative, the error signal for the loop is set to the difference value resulting in the optimum measurement timing offset being biased towards the test timing offset.

In some embodiments, an error signal may be generated by combining a first difference measure for a first test timing offset slightly before the optimum measurement timing offset and a second difference measure for a second test timing offset slightly after the optimum measurement timing offset. The difference measures may first be set to zero for values indicating that the demodulation depth at the optimum measurement timing offset is higher. The resulting difference measures may then be subtracted from each other and the result may be used as an error signal for a control loop determining the optimum measurement timing offset.

This approach may provide substantially improved communication reliability and reduced error rate.

In many embodiments, the power transfer signal frequency is set to provide a desired power transfer characteristic. Accordingly, it is typically not optimized for the demodulation performance.

As a specific example, In the Qi low power Specification, the current flowing through the power transmitter coil and/or the voltage across this coil is demodulated (ref e.g. Qi system description, wireless power transfer, volume I: low power, part 1: interface definition, Version 1.1.2, June 2013). The power transmitter demodulates the measured signal by detecting a certain current or voltage difference between the binary load states, referred to as the HI and LO states (see Section 6 of the Qi system description previously referenced). In the standard Qi approach, the current flowing through the power transmitter coil is measured as the peak amplitude or by a fixed predetermined timing offset of one quarter of the cycle (i.e. at a 90 degree phase) relative to the control/switch signal driving the inverter. Thus, the difference between the HI and LO states corresponds to the (peak) amplitude difference between the two states or to the amplitude difference measured with a specific, fixed and predetermined offset. The voltage may also be measured but is also measured with a fixed, predetermined time offset. Specifically, the amplitude of the voltage signal is measured with a zero time offset (corresponding to a 0° phase offset).

However, the Inventors have realized that these measurements typically do not result in the optimum/maximum demodulation depth that can be achieved.

Figure 6:
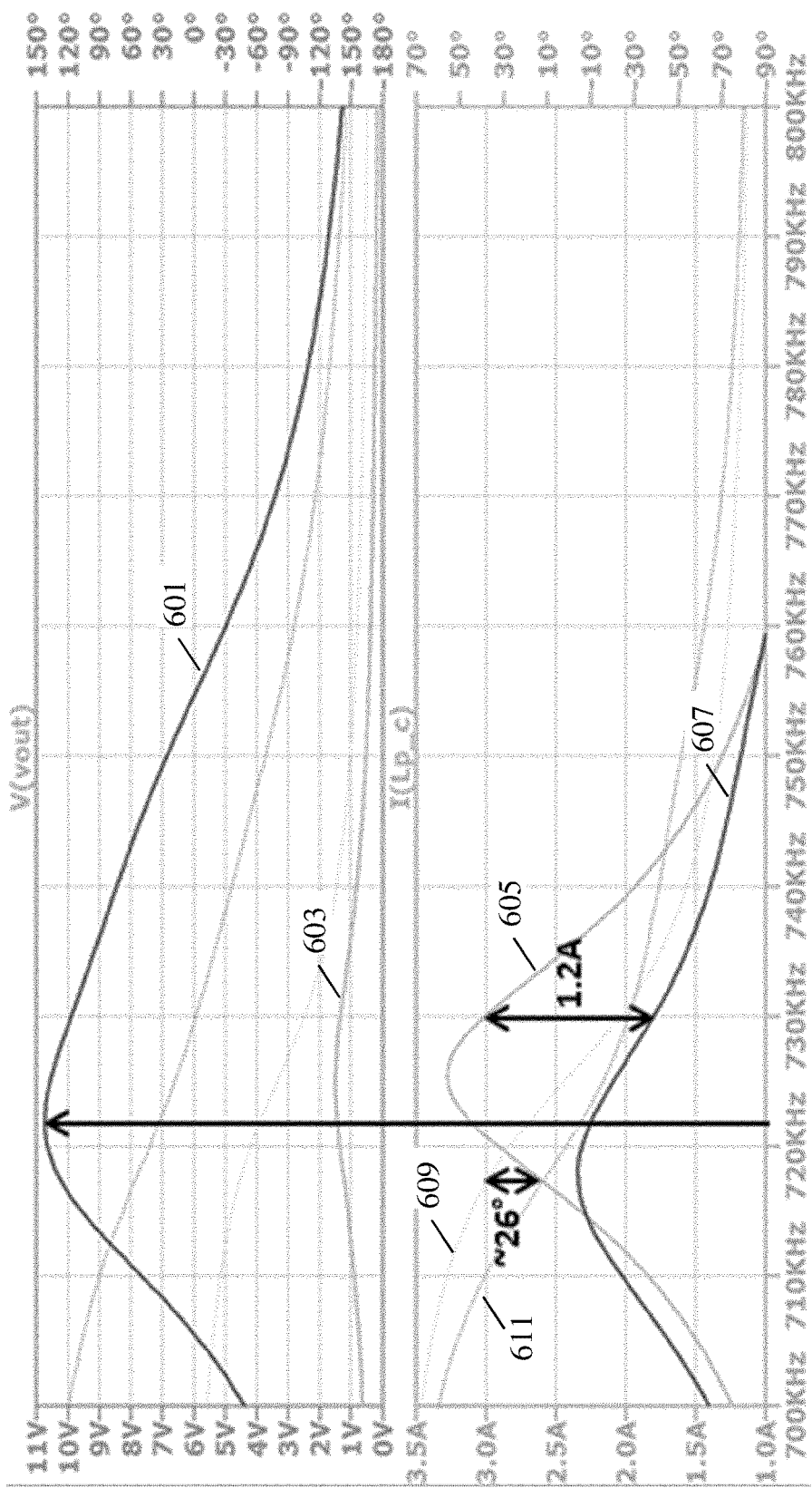
FIG. 6 illustrates an example of parameters of a power transfer system as a function of the frequency of the power transfer signal.

FIG. 6 illustrates some curves illustrating parameters as a function of the frequency of the power transfer signal. Curves 601 and 603 respectively show the amplitude of the voltage across the load for the situations where the load modulation capacitor is disconnected and connected respectively. Curves 605 and 607 show the inductor current for the transmitter for respectively the capacitor being connected and disconnected, and Curves 609 and 611 show the phase of the inductor current for the same scenarios.

As can be seen, the frequency at which an optimum amplitude demodulation depth is obtained for the inductor current is at 730 kHz whereas the frequency at which an optimum phase demodulation depth is obtained is at 718 kHz. At other frequencies, no optimum demodulation depth (for the amplitude or phase) is obtained. Moreover, as can be seen, the maximum signal amplitude across the load is reached at none of these frequencies. Rather, it is obtained at a frequency of approximately 722 kHz.

Thus, as demonstrated the desired or optimum frequency for power transfer is different from the optimum frequency for load modulation/demodulation. Therefore, when setting the frequency to provide desired power transfer properties, the communication performance may be not be optimized.

Although the frequency range in FIG. 6 has been chosen differently from typical for Qi applications, the same principle also applies for the frequency range of Qi. FIG. 6 is provided as an example for clarifying the operation.

Furthermore, the inventors have also realized that the optimum time to measure e.g. the inductor current may vary substantially depending on e.g. the frequency, the loading or the coupling.

Figure 7:
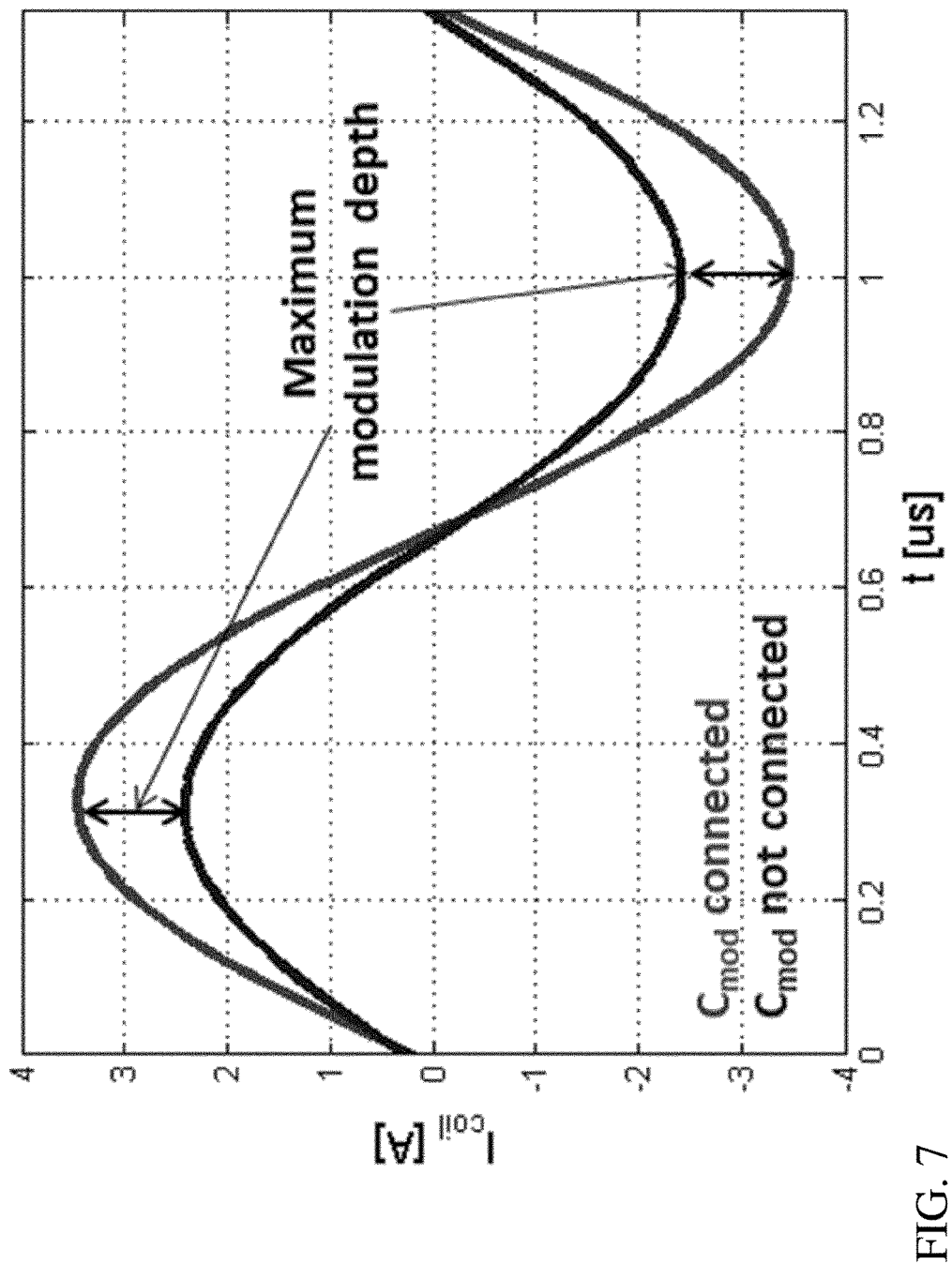
FIGS. 7-9 illustrates examples of coil currents for a power transmitter coil for different scenarios for a power transfer system in accordance with some embodiments of the invention.
Figure 8:
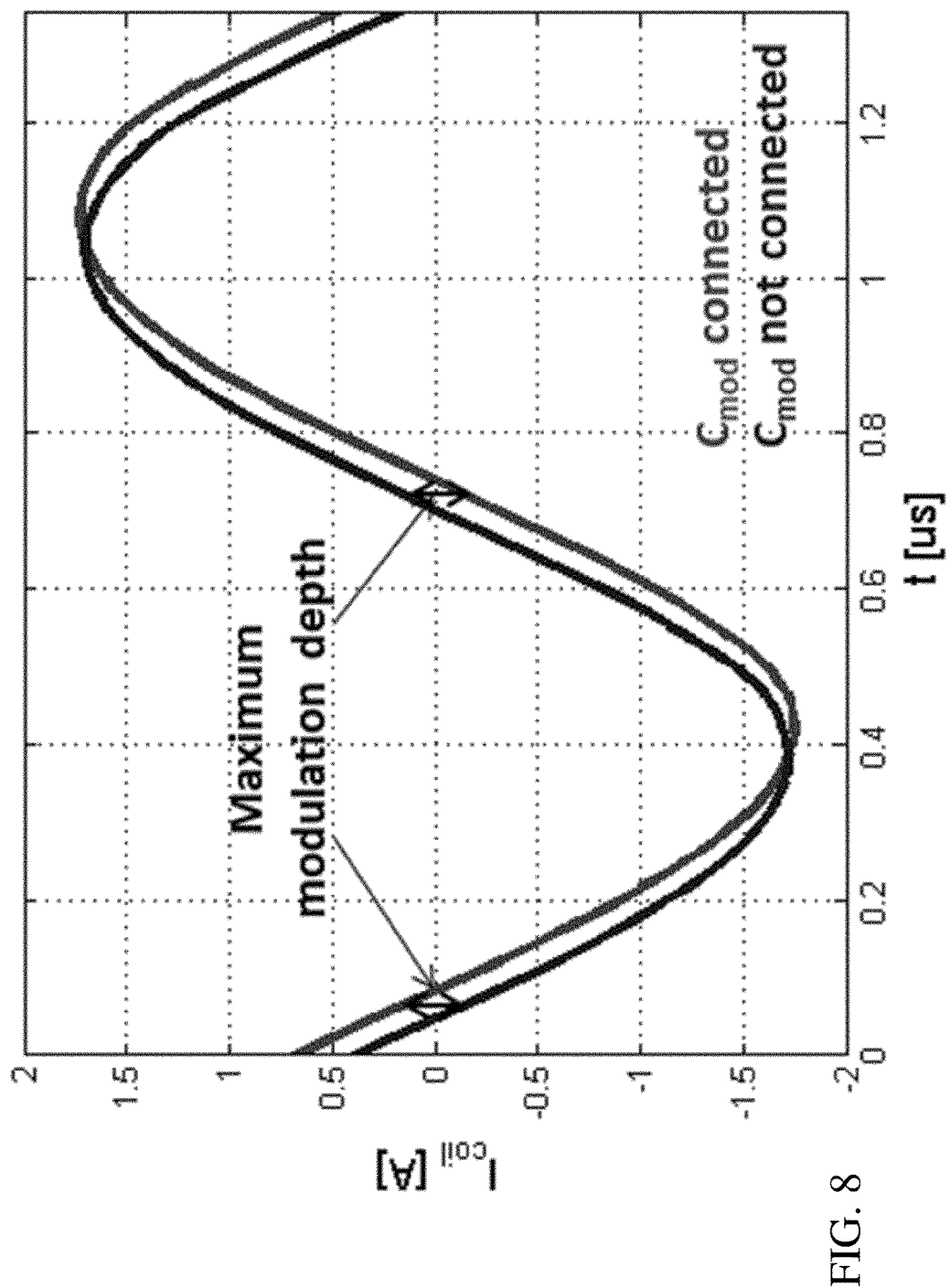
Figure 9:
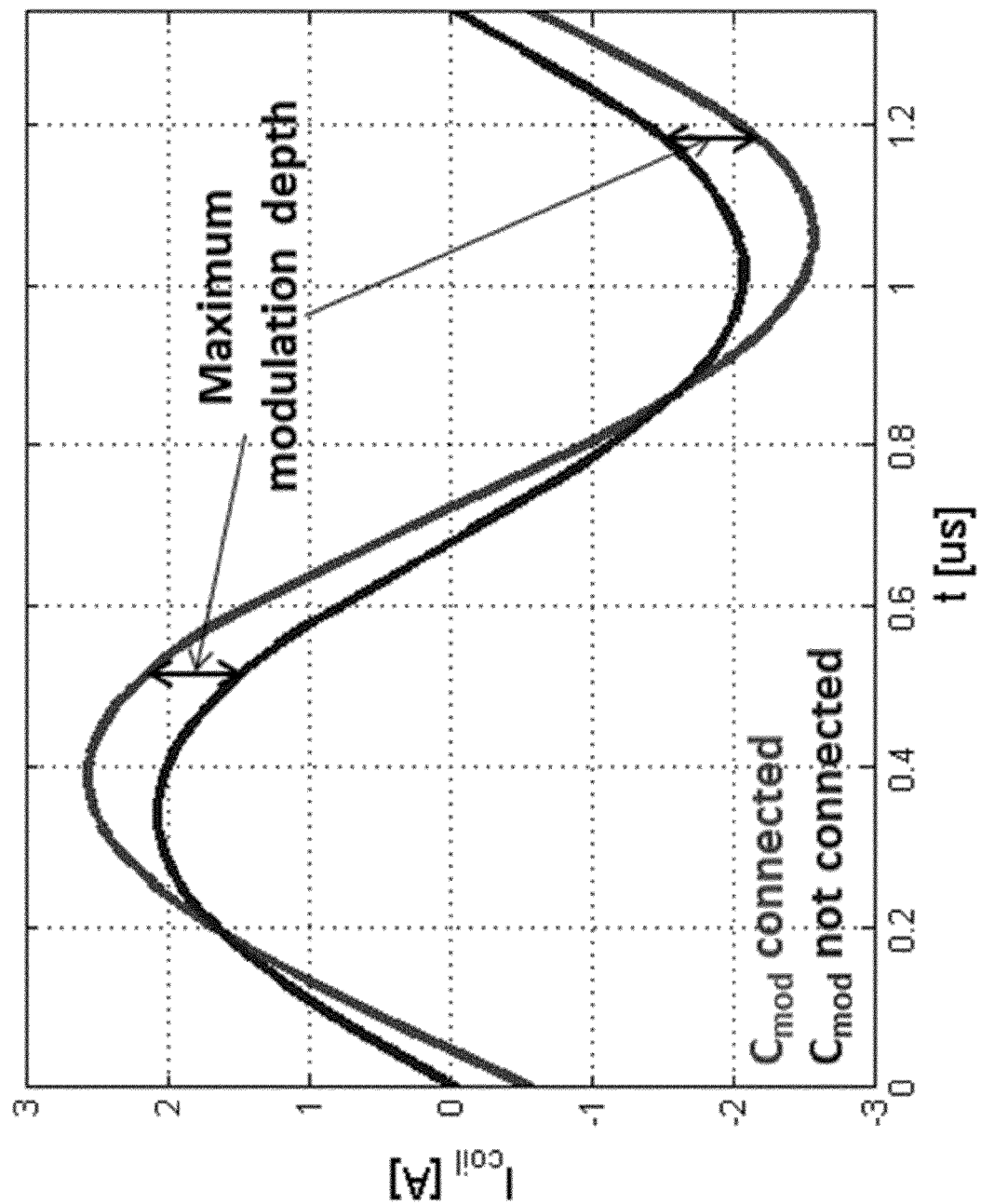

FIG. 7 depicts the current flowing through the transmit coil of a power transmitter. As shown, if the operating frequency is set to 735 kHz, the maximum modulation depth occurs at the positive and negative peaks of the current. On the other hand, if the operating frequency is set to 760 kHz, the maximum modulation depth occurs at the zero crossings of the current, as shown in FIG. 8. If the operating frequency is set to 745 kHz, the maximum modulation depth does not occur at the peaks or the zero crossings of the current. Such an example is shown in FIG. 9. In this case, the approach of the Qi Specification would result in substantially compromised communication performance. In the described approach however, the power transmitter 101 can tune the phase/timing offset for the measurements, and specifically for the sampling of the inductor current, such that the phase/timing offset resulting in the largest demodulation depth is applied. For the case described in FIG. 9, the adaptation of the timing offset will be such that the measurement sampling corresponds to the largest difference (i.e. with a relative timing offset of around 0.5 µs and 1.2 µs).

In the described power transmitter 101 of FIG. 3, the adaptor 313 is arranged to track the optimum demodulation depth by varying the instant in time at which the signal is demodulated (when the inductor current/voltage is sampled or measured). In other words, the measurements have a timing offset in relation to a reference signal, such as the control signal driving the inverter, which is set to provide the optimum demodulation depth. For example, in FIG. 7, the adapter may set the timing offset may be 0.3 µs, in FIG. 8 it may be set to 0.05 µs, and in FIG. 9 it may be set to 0.5 µs (for a reference signal with the same timing as the inductor current). By adapting the sampling time for the first measurements, the demodulation performance may be improved and in particular, the error rate may be reduced.

As previously mentioned, in many embodiments, the power transmitter 101 comprises a power transfer adapter arranged to select a frequency of the power transfer signal based on a power transfer property. In the example of FIG. 1, the transmit controller 307 may implement the functionality of such a power transfer adapter and may accordingly adapt and set the frequency of the power transfer signal based on the power transfer operation.

It will be appreciated that the frequency may be set based on different properties of the power transfer in different embodiments. In many embodiments, the property may be a power transfer efficiency property, a power level property and/or a power requirement property.

For example, the resonance frequency of the resonance circuit 303 may vary due to component variations, aging, temperature etc. Similarly, the resonance frequency of the resonance circuit of the power receiver 105 may vary between different power receivers and with time, temperature etc. The efficiency of the power transfer will typically depend on the relationship between the resonance frequencies and the frequency of the power transfer signal. In some embodiments, the transmit controller 307 may be arranged to adapt the power transfer signal frequency to maximize efficiency of the power transfer. This adaptation may for example be performed once during the initialization of a power transfer or may be performed dynamically and repeatedly during power transfer.

As another example, in many embodiments, the frequency of the power transfer signal may be dynamically changed during the power transfer operation in order to provide a desired power level for the power transfer signal such that the power receiver 105 receives appropriate power. The approach is based on the fact that the transferred power depends on the relationship between the frequency of the power transfer signal and the resonance frequencies of the resonance circuits of the power transmitter 101 and power receiver 105. In general, the transferred power tends to reduce as difference between the frequency of the power transfer signal and the resonance frequencies increase.

In many embodiments, the power receiver 105 provides an indication of a power requirement, and the power transmitter 101 responds to such a requirement by adjusting the power level of the power transfer signal. The power requirement may in some embodiments be provided as an absolute value, such as a desired power level, but is in most embodiments provided as a relative value indicating e.g. whether the current power level should be increased or decreased.

Specifically, in the described system, the power receiver 105 transmits power control messages during the power transfer phase in accordance with the Qi Specifications (i.e. they are transmitted by load modulation and at least once every 250 msec). In response, the transmit controller 307 increases or decreases the frequency of the power transfer signal. For example, if the current frequency is higher than the resonance frequencies of the resonance circuits and the power receiver 105 requests a power increase, the transmit controller 307 proceeds to reduce the frequency.

The variation of the frequency of the power transfer signal in response to power transfer operation allows very efficient and high performance control of the power transfer. However, as it requires setting of the frequency to provide desired power transfer characteristics, it tends to be in conflict with the preferences for the frequency of the power transfer signal for communication, and specifically load modulation and demodulation, purposes. Thus, optimizing the frequency for the power transfer typically results in a degradation for communication purposes. In the system of FIG. 1, the frequency may accordingly be set based on power transfer considerations but the measurement timing offset(s) (and possibly the measurement duration(s)) are set based on communication considerations, and specifically on load modulation/demodulation considerations. Specifically, the frequency may first be set for the power transfer, with the system then being arranged to optimize the measurement performance for the given frequency. Such an approach may provide a very efficient power transfer system with improved power transfer operation based on improved communication.

In the previous description, the measurements of the inductor current/voltage has predominantly been considered to be by sampling, and thus with a sampling duration that typically is so short that the measured signal can be considered constant within the sampling window. For example, typically the sampling time is at least 10 times less than a time period of a highest frequency of the signal being sampled. Typically, the duration of a sampling is no more than 10 µs, and often no more than 1 µs.

However, in other embodiments, a measurement of the inductor current/voltage may be over a longer duration. For example, a measurement may be performed over a measurement time interval which is less than a time period of the reference signal but more than 1, 2, 5, 10 or even 20% of a time period. The extended measurement time may be advantageous in many scenarios or embodiments as it may provide some low pass filtering or averaging resulting in improved signal to noise ratio, and accordingly in reduced error rates and improved communication.

The use of measurement time intervals may also be particularly suitable for analog implementations and may facilitate implementation.

In some embodiments, the adaptor 313 is arranged to not only determine the optimum timing/phase offset but also to determine the optimum measurement duration as a duration of the measurement time intervals that result in the highest demodulation depth.

The adaptor 313 may thus vary the duration and determine the demodulation depth for different durations. It may then proceed to determine the duration for which the highest demodulation depth is measured (or e.g. interpolate between a neighbor pair of the duration with the highest demodulation depth). The determined duration is then considered the optimum measurement duration, and this may subsequently be used for generating measurements for demodulation.

As an example, the measurement unit 311 may choose an initial duration and start to increase the duration while the power receiver 105 is modulating the load. While increasing the duration, the adapter 313 determines whether the demodulation depth is increasing or decreasing. As long as the demodulation depth increases, the measurement unit 311 continues to increase the duration. When the demodulation depth decreases, the measurement unit 311 inverses the duration change and starts to decrease the duration and repeats this process. This allows a continuous adaptation of the duration towards maximum demodulation depth according to changing conditions (like the frequency, load and coupling).

It will be appreciated that the adaptor when determining a maximum demodulation depth for the timing offset and/or the measurement duration need not determine a global maximum but may e.g. determine a local maximum, e.g. corresponding to a maximum for maintaining one parameter constant and varying another parameter.

As an example, the adaptor 313 may first set the measurement duration to the lowest value possible (including potentially sampling the inductor current/voltage). It may then proceed to vary the time offset to find a (local) maximum demodulation depth for this minimum measurement duration. The optimum timing offset may be set to the value resulting in the maximum demodulation depth. Subsequently, the adaptor may keep the timing offset constant at this value and vary the duration of the measurement window (typically keeping the midpoint at a constant timing offset). The maximum demodulation depth for the different durations may be identified, e.g. as previously described for the timing by performing a sweep over the durations for each of the different load modulation load states and then determine the demodulation depth as the difference. The optimum duration may then be set to the corresponding duration resulting in the maximum demodulation depth. In this way, a local maximum demodulation depth is determined and the corresponding timing and duration of the measurements may subsequently be used for demodulating the load modulation.

As described, the demodulation may be based on measurements of the inductor current for the transmitter coil 103. In other embodiments, the demodulation may be based on measurements of the voltage over the transmitter coil 103, and indeed in many embodiments the demodulation may be based on both measurements of the inductor current and inductor voltage for the transmitter coil 103. For example, measurements may be made of both inductor voltage and inductor current and the demodulator may generate independent soft-decisions on which data symbols are transmitted (i.e. the decision not only reflects the most likely received data symbols but also the likelihood of this being the correct value). The two individual soft-decisions for a given data symbol may then be combined and a hard-decision of the received data bit may be generated based on the combined soft-decision symbol.

In some embodiments, the same timing offset and duration may be used for generating the inductor current and voltage measurements. However, in other embodiments, the timing offset and/or duration may be individually controlled for the inductor current and voltage measurements respectively. Specifically, in some embodiments, the measurement unit 311 may generate measurements of the inductor current and the inductor voltage with different time offsets relative to the reference signal, and the demodulator 309 may demodulate the load modulation based on both measurements of the inductor current and the inductor voltage, for example by independently generating soft-decisions which are then combined into a hard-decision.

More specifically, the measurement unit 311 may be arranged to measure the inductor current with a first time offset relative to the reference signal, e.g. by sampling the inductor current at time instants corresponding to the first time offset. At the same time, the measurement unit 311 may comprise functionality for measuring the inductor voltage with a second time offset relative to the reference signal, e.g. by sampling the inductor voltage at time instants corresponding to the second time offset.

The measurement unit 311 may be arranged to receive the first and second timing offsets from the adaptor 313.

The adaptor 313 may be arranged to determine the first timing offset as a first optimum timing offset which results in a maximum inductor current demodulation depth. This may specifically be performed as previously described by varying the first timing offset while monitoring the demodulation depth for the inductor current only.

In addition, the adaptor 313 may be arranged to determine a second optimum timing offset by varying the second timing offset to find the second timing offset which will result in a maximum inductor voltage demodulation depth. The second timing offset may then be set to this optimum timing offset.

In the example, the adaptor 313 may thus independently vary the first timing offset and the second timing offset, and independently determine a first demodulation depth and a second demodulation depth respectively. The first demodulation depth may specifically be determined as a demodulation depth reflecting a measurement difference between first measurements for different modulation loads of the power transfer signal, i.e. between inductor current measurements for different modulation loads. The second demodulation depth may specifically be determined as a demodulation depth reflecting a measurement difference between second measurements for different modulation loads of the power transfer signal, i.e. between inductor voltage measurements for different modulation loads.

In this way, the optimum timing offsets are independently determined for the inductor current measurements and the inductor voltage measurements such that maximum demodulation depth as achieved for both current and voltage. These time offsets are then individually used for respectively the current and voltage measurements during the demodulation operation, i.e. the demodulation is performed based on inductor current measurements generated with the first optimum timing offset and inductor voltage measurements generated with the second optimum timing offset.

This may provide very efficient communication and may specifically optimize the determination of individual soft-decisions for the load modulation for respectfully the current and voltage measurements. The approach may specifically result in improved communication performance and typically in reduced error rates, and thus improved power transfer operation.

In this example, the inductor current and voltage measurement, adaptation and demodulation operations may accordingly be performed separately and independently with respect to the current and voltage measurements to generate independent soft decisions. The processing may thus be separate and independent for most operations and only when the soft decisions have been generated are they considered together by combining the soft decisions.

However, it will be appreciated that in some embodiments, the operation may be more integrated. For example, a demodulation depth may be determined as a combined measure reflecting both inductor current and voltage measurements. The combination of first and second timing offsets that maximize this demodulation depth may then be determined.

For example, a brute force approach may be applied where a range of different combinations of first and second timing offsets are set, and the resulting combined demodulation depth is measured. The first and second timing offsets may then be selected as the ones for the combination resulting in the highest demodulation depth. As another example, the second timing offset may first be set to a nominal value, and the first timing offset be varied to find the maximum demodulation depth. The first timing offset may then be set to the offset resulting in the maximum demodulation depth, and the second timing offset may then be varied to find the maximum demodulation depth. The resulting combined value may then be used, or further iterations may be performed. Although such an approach may find a local but possibly non-global maximum for the demodulation depth, this will typically be acceptable. Also, the described approaches may be combined, e.g. by first comparing a relatively low number of combinations of first and second timing offsets, followed by a subsequent sequential optimization starting from the values of the combination resulting in the highest demodulation depth.

In some embodiments, the power transmitter 101 may additionally or alternatively also be arranged to individually adapt the measurement duration for inductor current and voltage measurements. Specifically, the approaches described above may also be applied to the duration of the measurements. For example, the measurement intervals may be set to nominal values, and the above described approach(es) may be used to determine the first and second timing offset. The adaptor 313 may then proceed to perform corresponding operations to determine the optimum measurement intervals for the given selected optimum timing offsets.

In some embodiments, the adaptation of the timing offset and/or the measurement duration may be performed at specific times during operation, such as specifically during the initialization of a power transfer (e.g. as part of the configuration phase or at the initialization of the power transfer phase). In such an example, the optimum time for measurements may be determined at the start of the power transfer, and the determined timing may be maintained from then on.

In other embodiments, the optimum timing offsets may e.g. be determined at regular time intervals during the power transfer phase, such as e.g. once every 2, 3 or 5 minutes. In such an example, the described approach for determining the optimum timing offset may thus be initialized at regular intervals.

In other embodiments, the power transmitter 101 may be arranged to initialize an adaptation of the timing offset (and/or the measurement duration) in response to a detection of an event, and specifically in response to a detection of a change in an operating characteristic of the power transfer.

For example, as will be described in more detail later, the Inventors have realized that the best timing of measurements of the inductor current/voltage for demodulation of load modulation is dependent on the frequency of the power transfer signal, on the loading of the power transfer signal, and on the coupling between the power transmitter and the power receiver (specifically the coupling between the transmitter inductor/coil 103 and the receiver inductor/coil 107).

In some embodiments, the transmit controller 307 (or equivalently it could be the adaptor 313) is arranged to initialize an adaptation of the timing offset and/or the measurement duration in response to a determination that the frequency of the power transfer signal is changed, i.e. it may initialize a determination of the optimum measurement timing offset in response to a change of the frequency of the power transfer signal.

For example, the transmit controller 307 may continuously change the frequency of the power transfer signal in response to power control messages received from the power receiver 105. Whenever the frequency is changed, it may compare the new frequency to the frequency for which the last adaptation of the timing offset was performed. If the new frequency differs from the stored frequency of the last adaptation by more than e.g. a (predetermined) threshold, the transmit controller 307 may proceed to instruct the adaptor 313 to begin a new adaptation process to determine a new optimum timing offset. It may then store the current frequency as a reference for future comparisons.

The Inventors have realized that the optimum timings for measuring inductor current/voltage is also dependent on the loading of the power transfer signal. In some embodiments, the load of the power transfer signal may be continuously measured, and the adaptor 313 may be arranged to initiate an adaptation in response to a detection of the load change.

For example, the transmit controller 307 may continuously measure the power consumption, i.e. the power provided to the transmitter coil 103/resonance circuit by the driver 301. The power consumption (loading) for the last adaptation may be stored and the current power consumption may continuously be compared to this. If the difference exceeds e.g. a (predetermined) threshold, the adaptor 313 may proceed to start a new adaptation process to determine a new optimum timing offset. It may then store the current power consumption as a reference for future comparisons.

The Inventors have realized that the optimum timings for measuring inductor current/voltage is also dependent on the coupling between the power transmitter and the power receiver (and specifically between the transmitter coil 103 and the receive coil 107). In some embodiments, the coupling between the power transmitter 101 and the power receiver 105 may be continuously monitored. This may for example be done by relating the needed inductor current to the received power for a given load. If the coupling decreases the inductor current has to be higher to achieve the same received power.

The adaptor 313 may then be arranged to initiate an adaptation of the timing offset (and/or the measurement duration) in response to a detection of a change in the coupling.

For example, the transmit controller 307 may continuously measure the coupling as a relation between inductor and reported received power at a given load. The coupling for the last adaptation may be stored and the current coupling may be compared to this. If the difference exceeds e.g. a (predetermined) threshold, the adaptor 313 may proceed to start a new adaptation process to determine a new optimum timing offset. It may then store the current coupling as a reference for future comparisons.

Instead of detecting a change in the frequency, load or coupling, the transmit demodulator 309 may monitor the modulation depth. When it detects a change, especially a degradation of the modulation depth, which can be the result of any change any parameter that influences the modulation (frequency, load, coupling), the adapter 313 may proceed to start a new adaptation process.

Instead of being triggered by a parameter change (frequency, load, coupling), or change in the modulation depth, the adapter 313 may continuously seek for the maximum modulation depth, e.g. by continuously varying the offset and/or duration in small steps thereby using feedback from the demodulator 309 whether de modulation depth is increasing or decreasing due to such a step.

It will be appreciated that any suitable demodulation approach may be used based on the measurements of the inductor current and/or voltage. Indeed, the skilled person will appreciate that many demodulation techniques are available including a posterior or a priori maximum likelihood techniques. It will also be appreciated that any suitable approach may be used e.g. for synchronizing to data symbols etc.

Typically, the measurements may be processed (typically filtered or averaged, e.g. using a matched filter which matched to the data symbol shape) and the resulting output may be sampled at the optimum sampling instant as will be well known to the person skilled in demodulation techniques (ref. e.g. John Proakis, "Digital Communications", McGraw Hill, 2008, ISBN 0071263780). The resulting sample value may be compared to the expected values for different symbol values and the closest one selected (based on a suitable distance measure). Thus, a demodulation approach may be used wherein the received signal (measurements) is (are) compared to the expected signal (measurements) for different possible data symbols, and the demodulated data is determined as the possible data symbol having the lowest (typically Hamming) distance to the expected signal (measurements) is selected. It will be appreciated that the distance determination/comparison may include processing, such as e.g. filtering and averaging, of the measurements. Thus, typically a maximum likelihood approach where the nearest constellation point is selected may be used for demodulation.

As a low complexity approach for binary data symbols (i.e. a "0" or "1" is transmitted), the demodulator 311 may determine a threshold as a long term average of the measurements. The averaging will extend over multiple data values and will typically correspond to an average measurement value between the values resulting from respectively a "0" or a "1". When demodulating one bit, the demodulator 311 may average the measurements over a corresponding data symbol (bit) time period. If the resulting value is above the long term threshold, the data bit is demodulated as a "0" and if it is below the long term threshold, the data bit is demodulated as a "1" (assuming the load modulation is such that "0" results in higher values of the measurements than a "1").

It will be appreciated that many possible demodulation techniques are known to the skilled person and that any technique may be used without detracting from the invention.

In the following, aspects, features, considerations etc. of the approach of the system of FIG. 1 will be describe in more detail with specific reference to in particular the setup of FIGS. 10 and 11. In the example, the power transmitter 101 is represented by a power transfer block 1001 which includes the transmit controller 307 and driver 301 of FIG. 3 and a demodulation block 1005 which includes the demodulator 311, the measurement unit 309 and the adapter 313 of FIG. 3.

Figure 10:
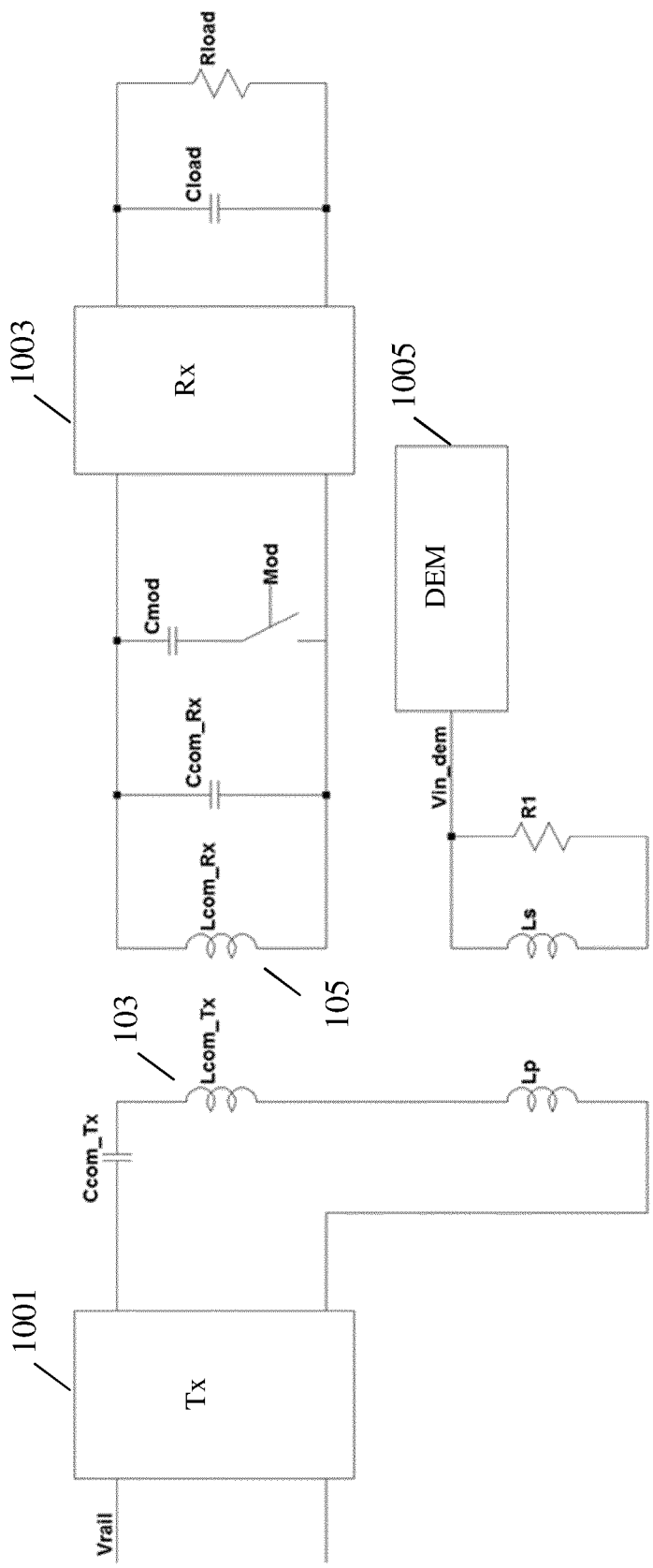
FIG. 10 illustrates an example of elements of a power transfer system in accordance with some embodiments of the invention.

As a specific example, the scenario of FIG. 10 may represent the communication link between a power transmitter and a kitchen appliance. The Wireless Power Consortium has established a Work Group to develop specifications for cordless kitchen appliances. These specifications are intended to define the interface between kitchen appliances and inductive power sources. Power requirements may vary from the 100 W range (i.e. simple juicers) to 1.5-2.4 kW for heating appliances, such as kettles.

Similar to the low power Qi Specifications, cordless kitchen appliances must be able to communicate with the power transmitter on which they are placed. However, once the communication link is established, the physical properties of the link (coupling of the coils, resonance frequency of the system, etc.) can vary. Examples of possible variations include:

During cooking, the user may (intentionally or unintentionally) move the appliance e.g. a few centimeters. While the power link may support such a change, the coupling between the communication coils could possibly vary such that the demodulation depth is decreased to an unacceptable level.

The electrical components such as the capacitors and the coils can vary in their electrical properties (i.e. resistance, inductance, and capacitance values) due to manufacturing variations and tolerances. Moreover, these properties can vary over time due to aging or to external parameters such as temperature. Thus, the resonance frequency of the communication circuitry of the power transmitter may vary with time. This variation can have a negative impact on the demodulation depth and prevent the correct demodulation of the data transmitted from the appliance.

In the approach of FIG. 10, the current through the transmitter (communication) coil 103 (Lcom_Tx) is measured via a current measurement inductor $L_p$ closely coupled to an inductor $L_s$ which has a resistor $R_1$ coupled in parallel. Thus, the current through the current measurement inductor $L_p$ induces a current in the inductor $L_s$ which is converted into a voltage $V_{in\_dem}$ which is proportional to the current through the transmitter coil 103. The voltage $V_{in\_dem}$ is accordingly a measurement of the inductor current of the transmitter coil 103. This measurement is then processed in the demodulation block 1005 to generate demodulated output data.

In the example of FIG. 10, the load modulation is introduced by the power receiver 105 by connecting/disconnecting a modulation capacitor $c_{mod}$ in parallel of the receiver resonance circuit formed by the receive coil 107 ($L_{com\_Rx}$) and a resonance circuit capacitor $c_{com\_Rx}$. The modulation capacitor $c_{mod}$ is switched by a switch Mod controlled by the control circuitry of the power receiver 105. The receiver resonance circuit is also provided to a power receiver block 1003 which performs the operation of the power receiver 105 including extracting power and providing it to the load $R_{load}$ and $C_{load}$.

Figure 11:
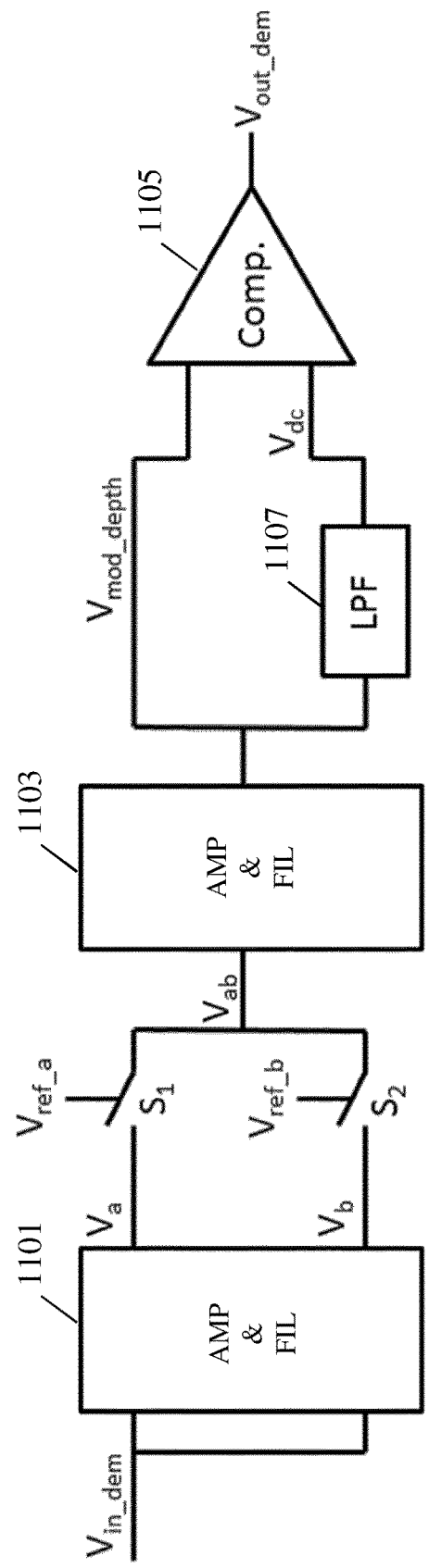
FIG. 11 illustrates an example of elements of a demodulation block for a power transmitter in accordance with some embodiments of the invention.

In the following, an exemplary demodulation block 1005 as shown in FIG. 11 will be considered in more detail. The input voltage $V_{in\_dem}$ represents the current flowing through the transmitter coil 103. This voltage is amplified and filtered in a first amplification block 1101 in order to obtain two voltages, $V_a$ and $V_b$. These two voltages, $V_a$ and $V_b$, are applied to the switches $S_1$ and $S_2$, respectively. The voltage $V_b$ is equivalent to the inverse of $V_a$. The two switches $S_1$ and $S_2$ are controlled by the reference signals $V_{ref\_a}$ and $V_{ref\_b}$, respectively. The phase difference between the reference signal $V_{ref\_a}$ and a reference signal synchronized to the power transfer signal (such as the switch signal for the inverter) is tuned in the range of 0-360 degree. The second reference signal $V_{ref\_b}$ has a 180 degree phase difference with $V_{ref\_a}$. Thus, the switches $S_1$ and $S_2$ alternately conduct. The period of time during which the switch $S_1$ and $S_2$ is closed is also tuneable between a very short period of time corresponding to a single sample and half the period of the power transfer signal. The switches $S_1$ and $S_2$ do not conduct simultaneously at any time. The period of time during which a switch is open corresponds to the measurement duration or time interval and is also referred to as the "measurement window". The outputs of the switches, i.e. the output voltage $V_{ab}$ thus corresponds to measurements of the inductor current.

The output voltage $V_{ab}$ of the switching stage is then amplified and low-pass filtered in a second amplification block 1103 in order to suppress high frequency carrier signal. The voltage $V_{mod\_depth}$ is obtained. This signal is then provided to the output stage comparator 1105. The second input of the comparator (i.e. $V_{dc}$) is the moving average of $V_{mod\_depth}$ determined by a low pass filter with a long averaging time. The amplitude difference between these two signals may be considered to be a representation of the demodulation depth (i.e. the difference between the current value for the given data symbol and the long term average across all possible data symbols (typically over the binary possible values corresponding to a "0" and "1").

The performance of the system of FIGS. 10 and 11 may be considered for the specific example of a cordless kitchen appliance being placed on top of a power transmitter. It is considered that the transmit and receive (communication) coils both have an inductance value of 2.3 μH. This inductance value may typically correspond to e.g. practical 15 cm diameter coils with two windings. These two coils form an inductive transformer having a low coupling factor of 0.04. Small coupling values in the range of 0.02 to 0.1 have been experimentally measured. The frequency of the power transfer signal (i.e. the carrier signal for the load modulation) is set to 745 kHz.

Figure 12:
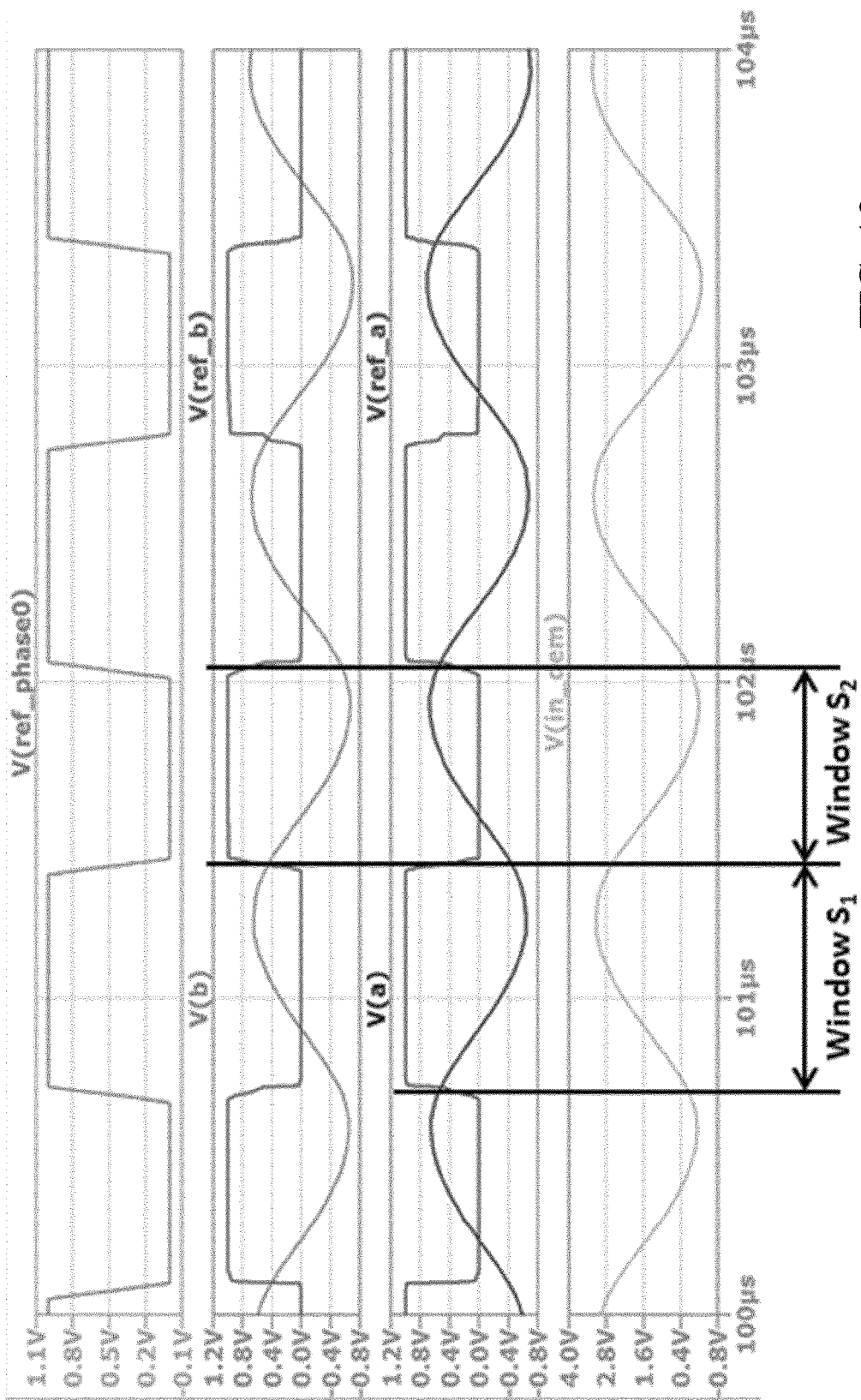
FIGS. 12-14 illustrates examples of signals for a power transmitter in accordance with some embodiments of the invention.

An example of the corresponding signals are illustrated in FIG. 12. The "measurement windows" of switch $S_1$ and $S_2$ are depicted relative to the reference signal V(ref_phase0) which corresponds to the switch signal for the inverter generating the power transfer signal.

In FIG. 12, the illustrated signals are (from bottom to top): The input voltage V(in_dem) of the demodulation circuit, the input voltages V(a) and V(b) (also referred to as $V_a$ and $V_b$) to the switches $S_1$ and $S_2$, the switch/measurement reference signals V(ref_a) and V(ref_b) that control the two switches and thus the measurements, and the reference signal V(ref_phase0) representing a phase difference of 0 degree with the signal driving the inverter (i.e. the reference signal synchronized to the power transfer signal). In the example, the phase difference/timing offset between V(ref_a) and the reference signal V(ref_phase0) is in this example zero and the phase difference/timing offset between V(ref_b) and the reference signal V(ref_phase0) is in this example 180° (i.e. the timing offset is set to zero and half a time period respectively) when measuring from the beginning of the measurement interval. The measurement duration is set to half the period of the power transfer signal.

Figure 13:
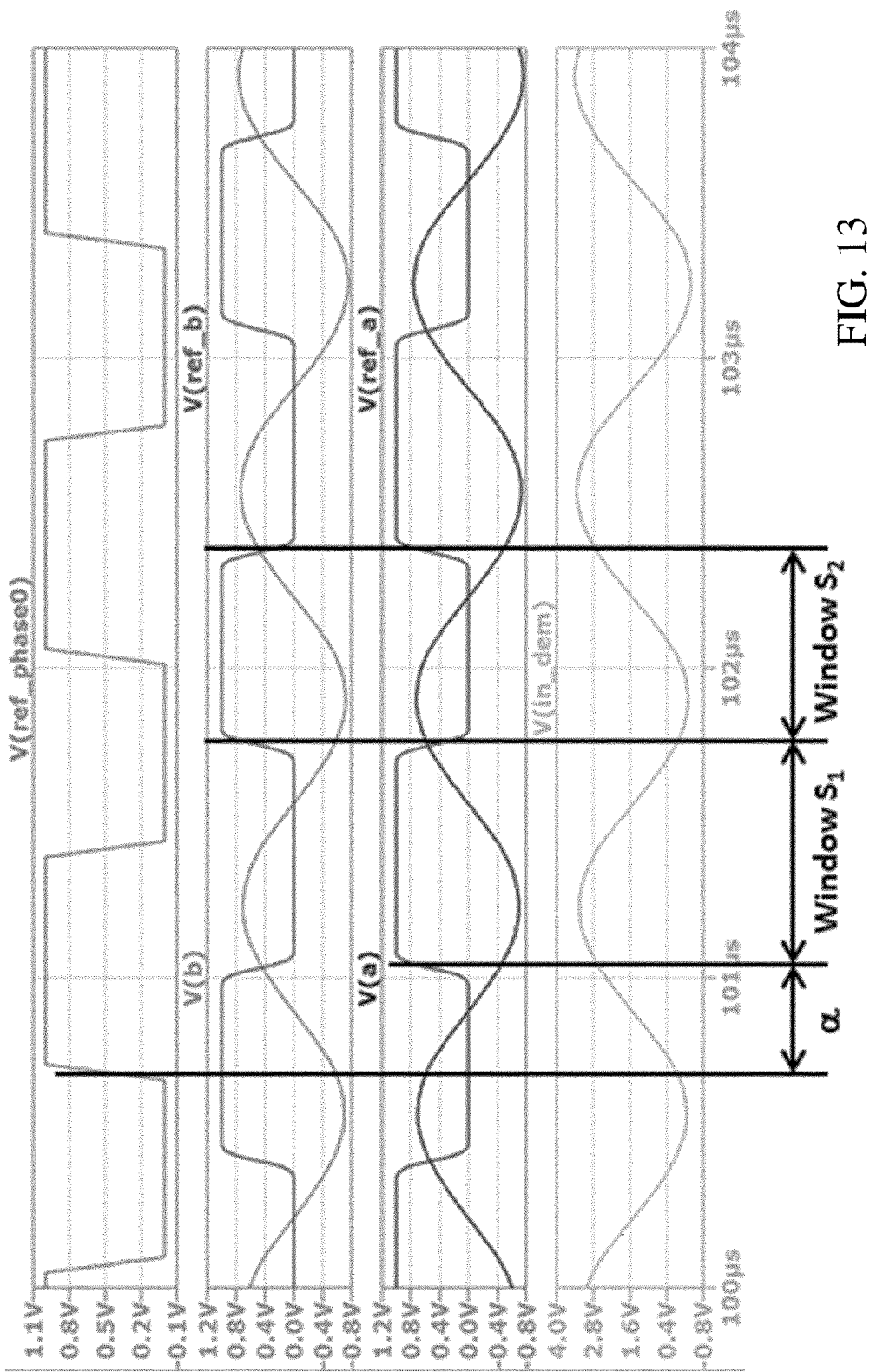
Figure 14:
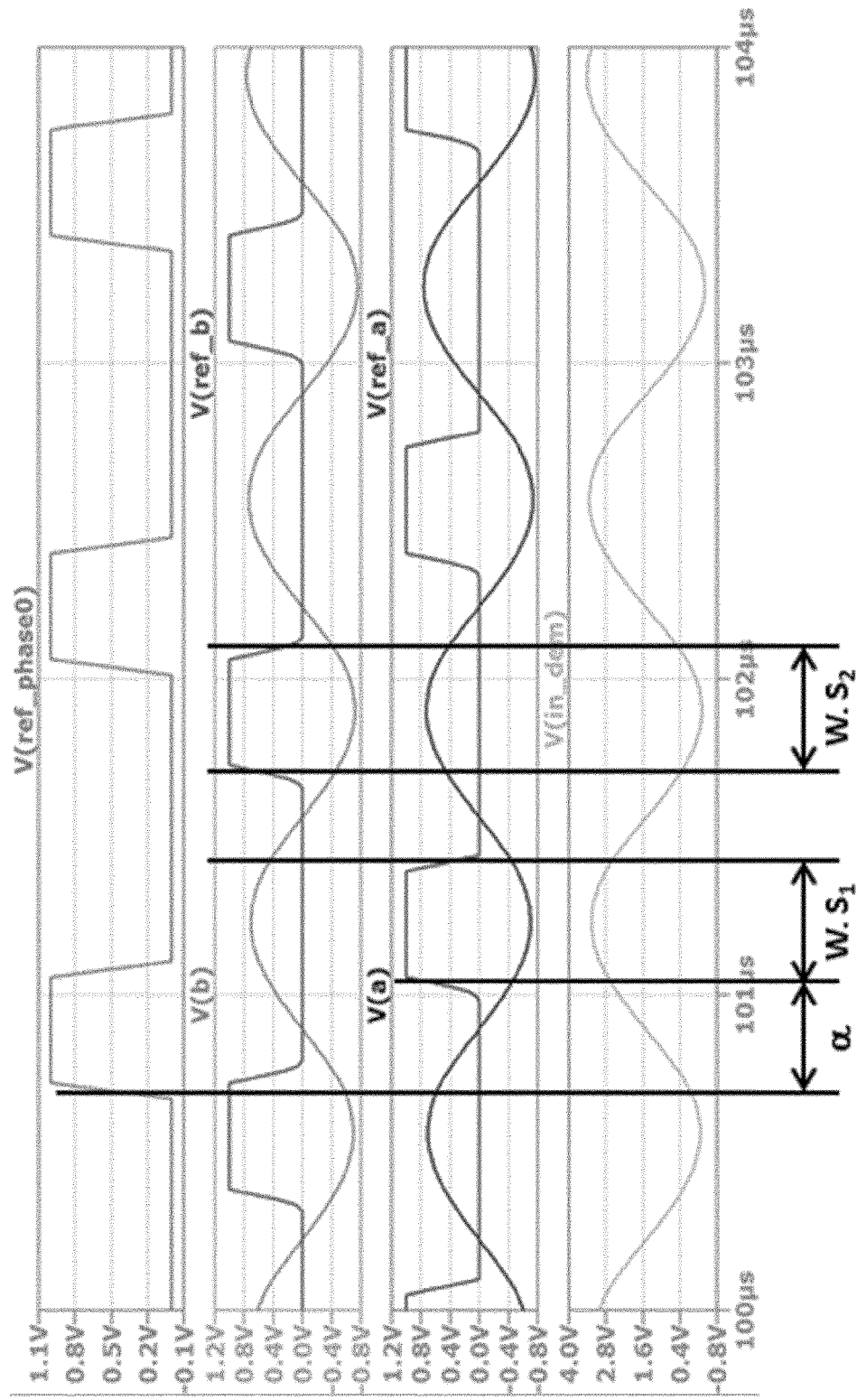

As mentioned earlier, the timing offsets/phase differences between the measurement control signals and the reference signal may be set to different values. FIG. 13 shows an example wherein the phase offset is increased by 90° (timing offset of a quarter of the time period) relative to the example of FIG. 12. In the example of FIG. 13, the measurement duration is set to half the period of the power transfer signal as in FIG. 12. FIG. 14 shows an example wherein the measurement duration has been decreased to ¼ time period.

Figure 15:
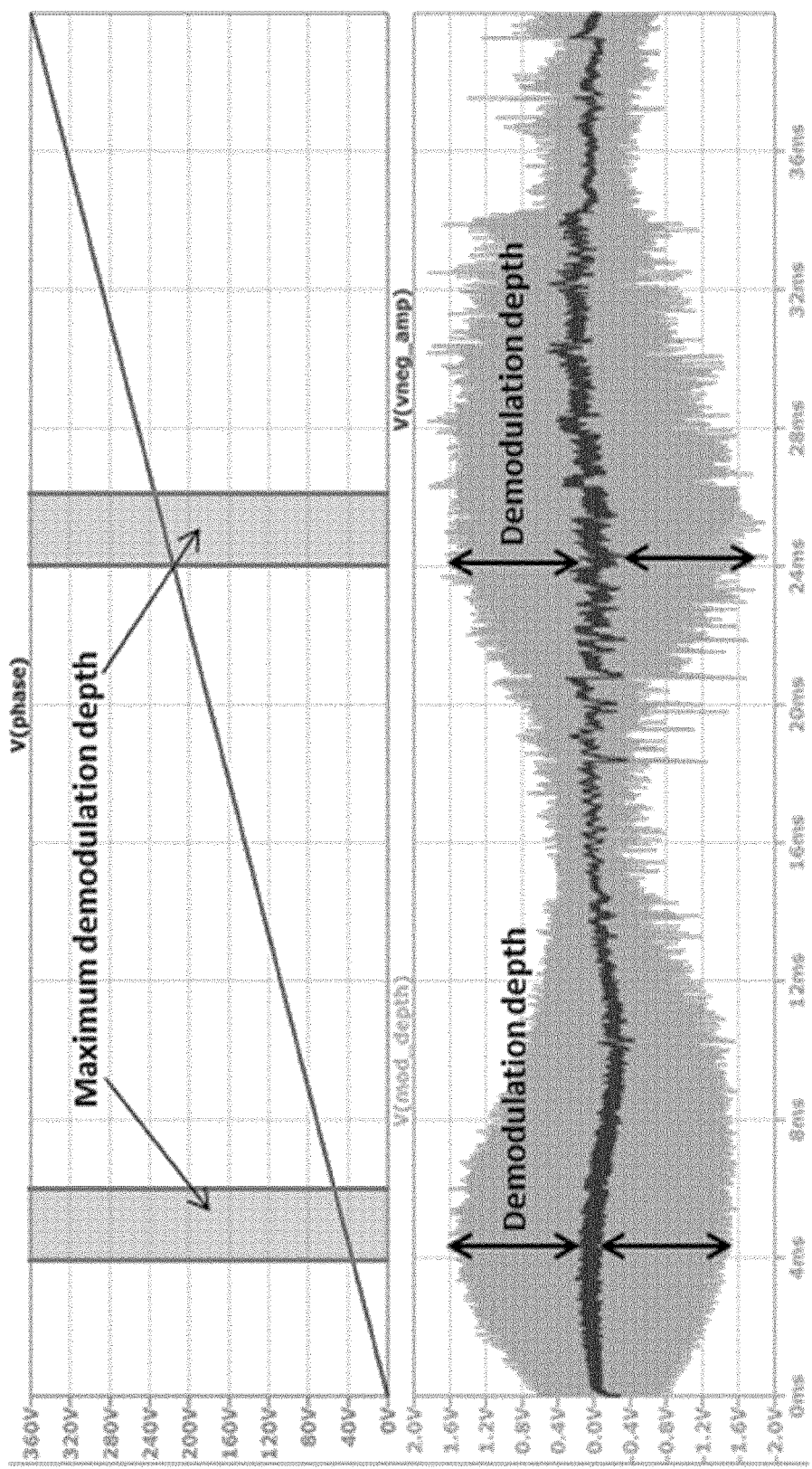
FIG. 15 illustrates an example of demodulation depth as a function of a timing offset for a power transmitter in accordance with some embodiments of the invention.

The variations in timing/phase offset and/or measurement duration will affect the demodulation depth. This is illustrated in FIG. 15, where the phase of the measurement signals V(a) and V(b) is linearly increased from 0 degree at 0 ms to 360 degree at 40 ms (and thus may correspond to a sweep during an adaptation). As shown, the maximum modulation depth varies substantially as a function of the timing/phase offset. In particular, it does not occur when the phase offset is at 0 degree or 90 degree, but in the specific example occurs when the phase is approximately in the range of 36-54 degrees (corresponding to a timing offset between 4 ms and 6 ms) and in the range of 216-234 degrees (a timing offset between 24 ms and 26 ms in FIG. 12). Thus, if a fixed predetermined timing offset is used, a very low demodulation depth will result in comparison to the described approach of adapting the timing offset to the current conditions.

These following paragraphs provide a more detailed explanation of the results shown in FIG. 15.

Figure 16:
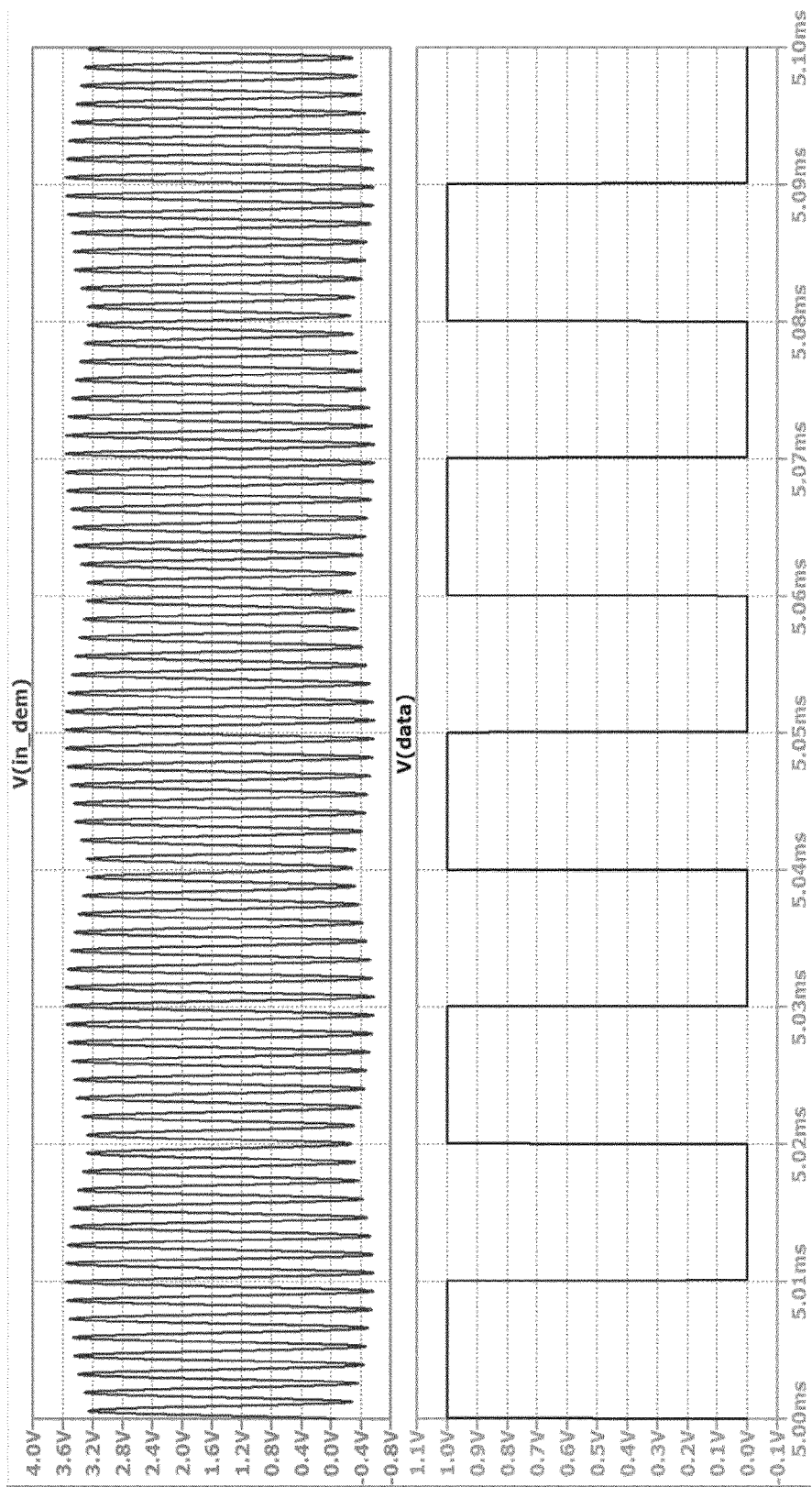
FIGS. 16-23 illustrate examples of operations of a power transfer system in accordance with some embodiments of the invention.
Figure 17:
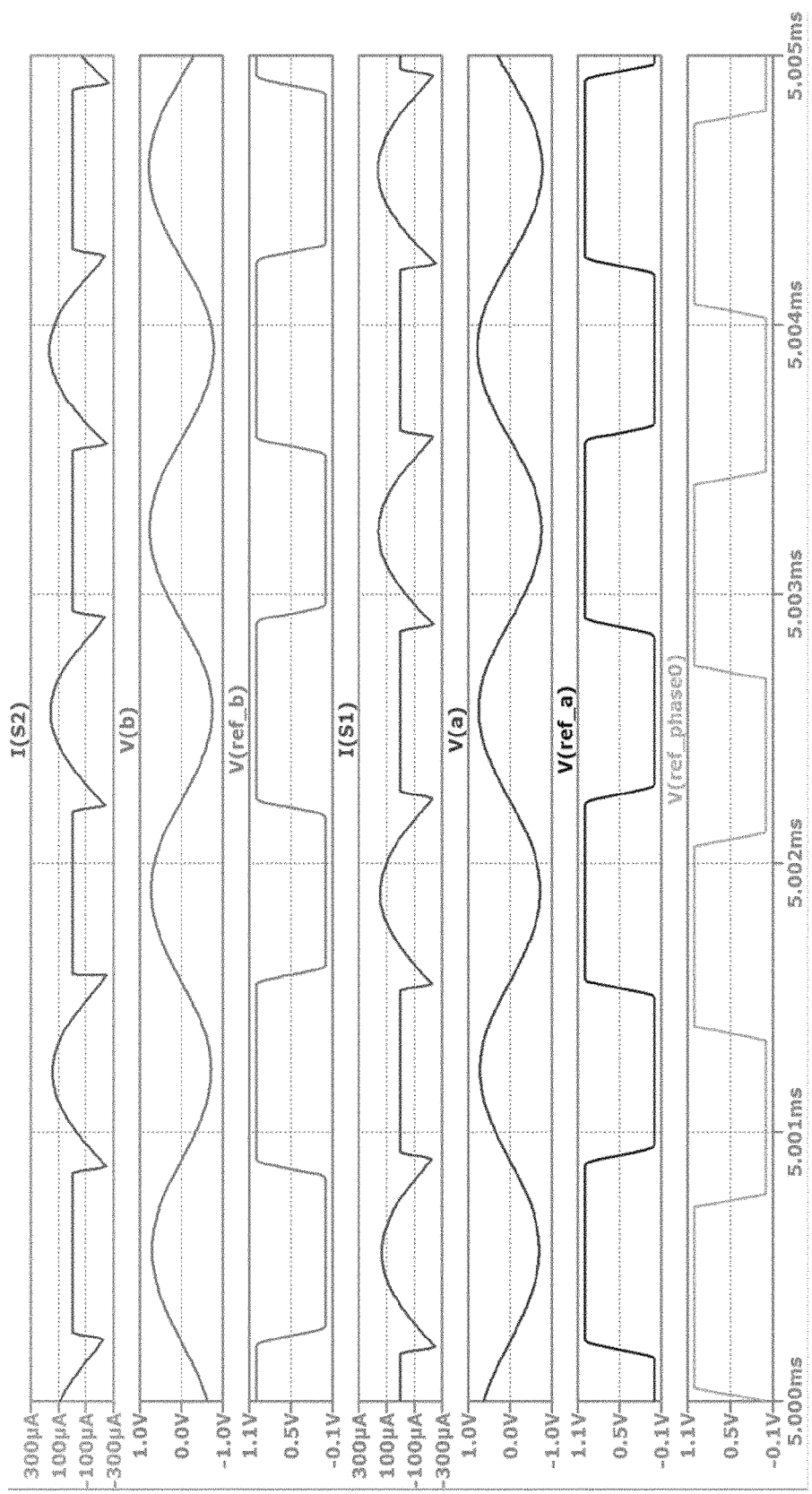

An example of the modulated data and the input voltage of the demodulation circuit is depicted in FIG. 16. In this example, the transmitted data is a clock signal at 50 kHz, i.e. the data is alternating between "0" and "1". FIG. 17 further illustrates the measurement switch signal V(ref_a) controlling switch S1 and the corresponding 180° degree measurement switch signal V(ref_b) controlling switch S2. The phase offset of the measurement switch signal V(ref_a) is in the example set to 45° relative to the reference signal V(ref_phase0). I(S1) and I(S2) are the currents flowing through S1 and S2, respectively.

As shown, the input voltage $V_b$ of switch $S_2$ is the input voltage $V_a$ of switch $S_1$ inverted. The measurement window is set to half the period of the carrier signal. Thus, each switch alternately conducts. The output voltage $V_{ab}$ of both switches is further processed (amplified and low-pass filtered) in order to obtain the input voltage $V_{mod\_depth}$ of the output stage comparator 1105.

Figure 18:
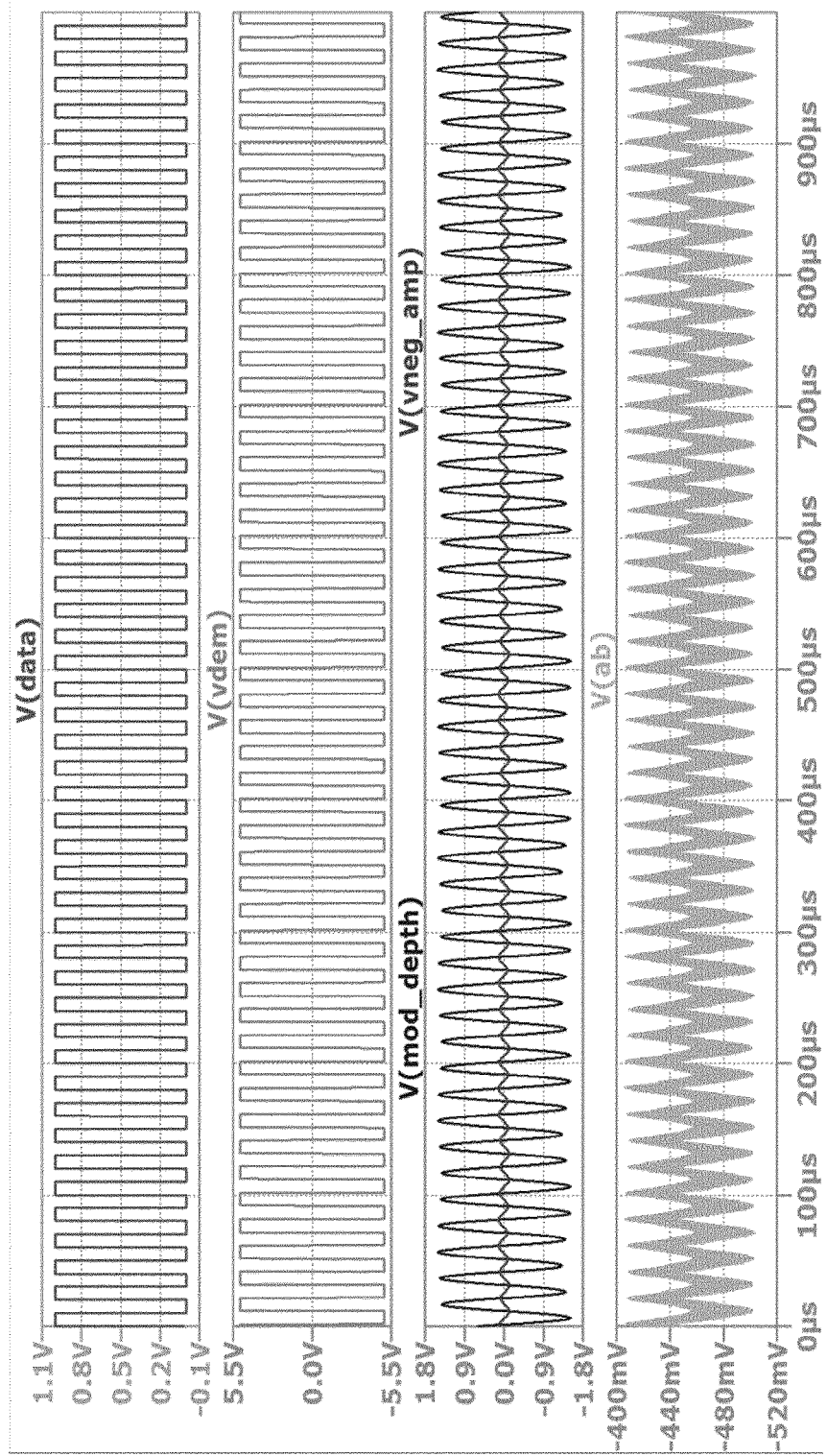

FIG. 18 further illustrates the signal V(ab) at the output of the switching stage (i.e. S1 and S2), the input signals V(mod_depth) and V(vneg_amp) of the output stage comparator 1105, the output signal V(vdem) of the demodulator (i.e. the output of the comparator 1105), and the original modulated data V(data).

Figure 19:
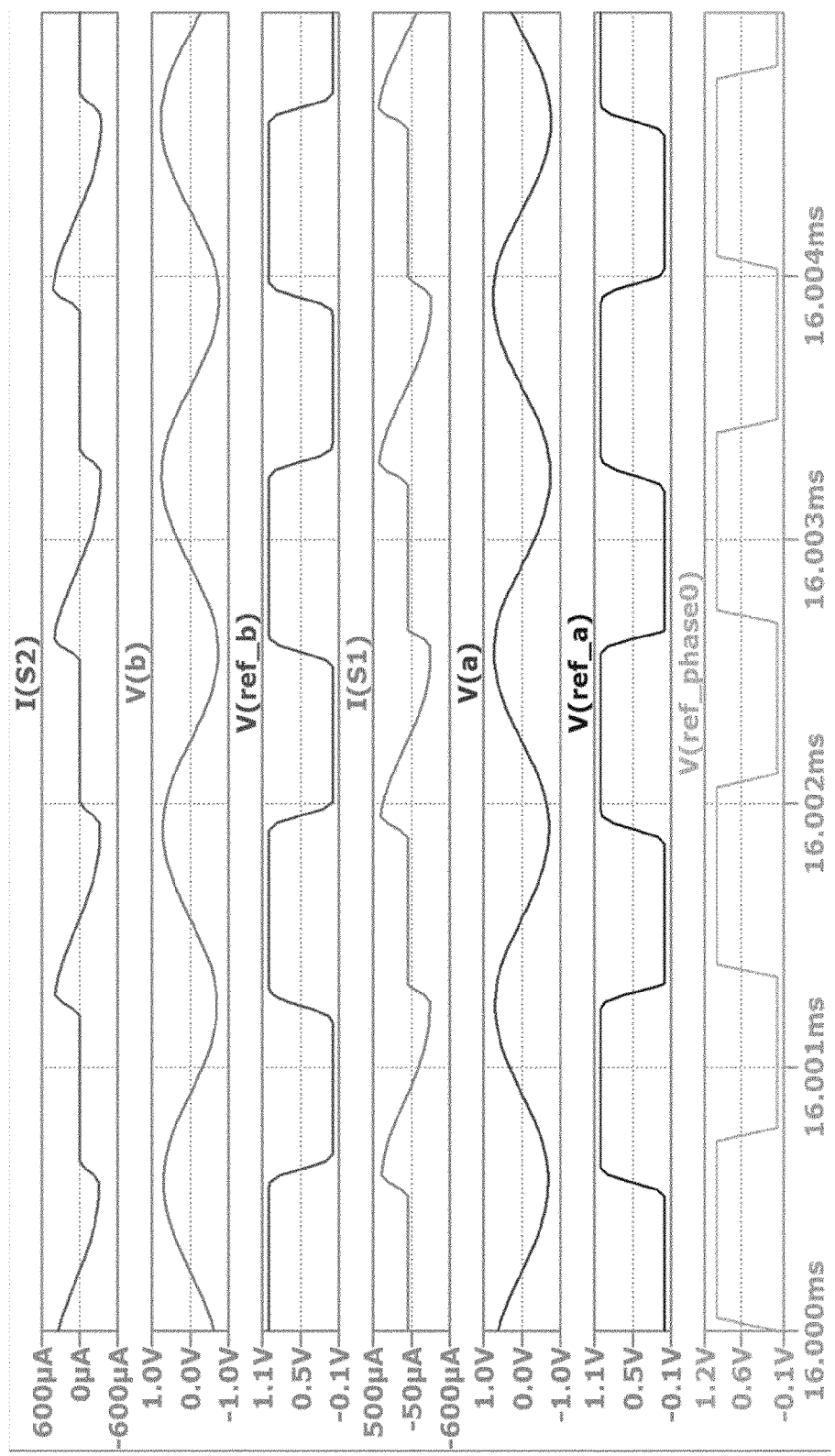
Figure 20:
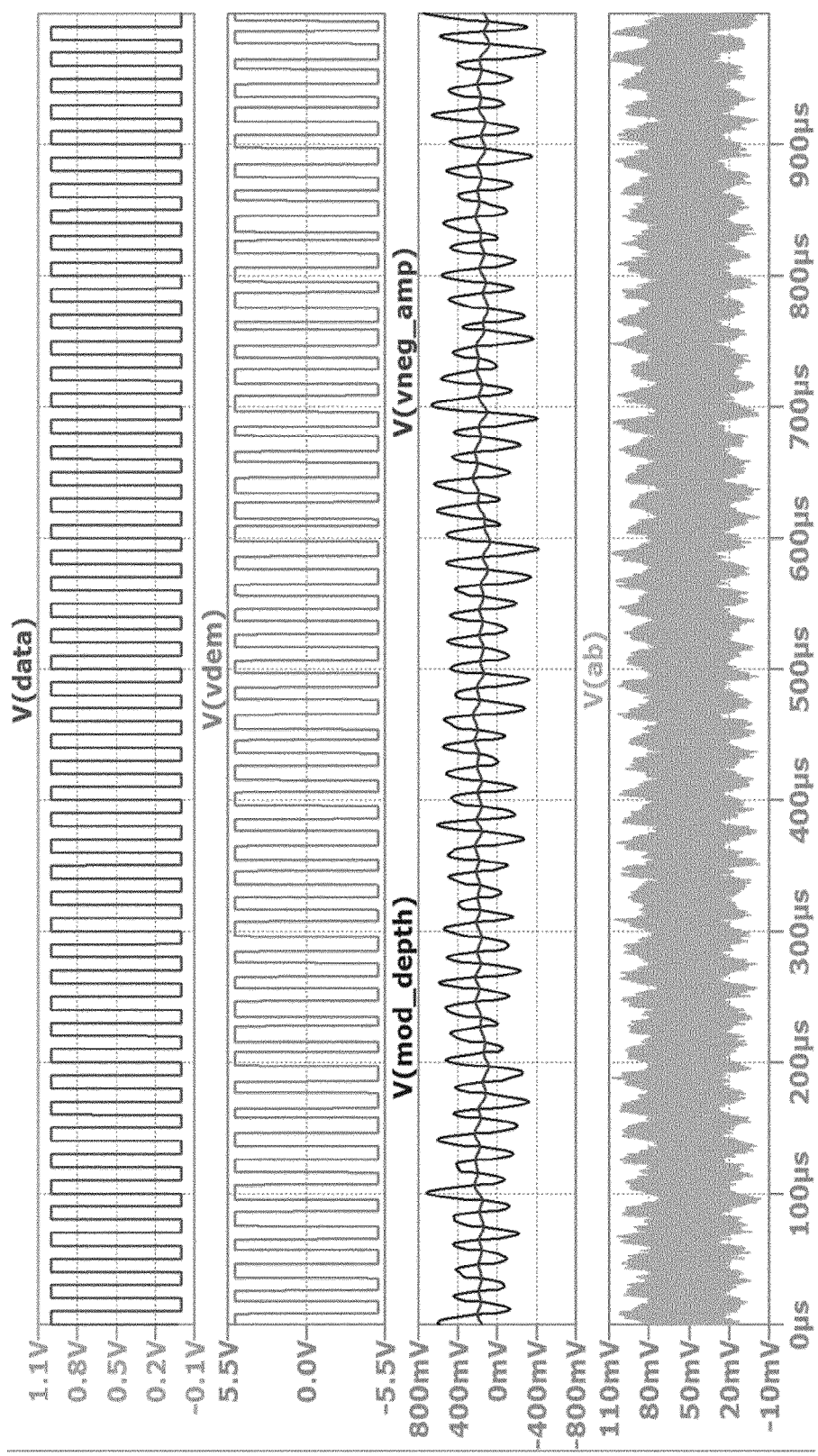

FIGS. 19 and 20 show the same signals as FIGS. 17 and 18 but for the example where the measurement phase offset is set to 144°. As shown in FIG. 15, this corresponds to the case where the modulation depth is minimum (i.e. around 16 ms). As can be seen in FIG. 20, the quality of the demodulated signal is not optimal since the modulation depth is much smaller than in FIG. 18.

As previously mentioned, the demodulation depth and the optimum measurement timing offset/durations may depend on the coupling between the power receiver and the power transmitter. Thus, can be further illustrated by considering a specific example for the system of FIGS. 10 and 11.

Figure 21:
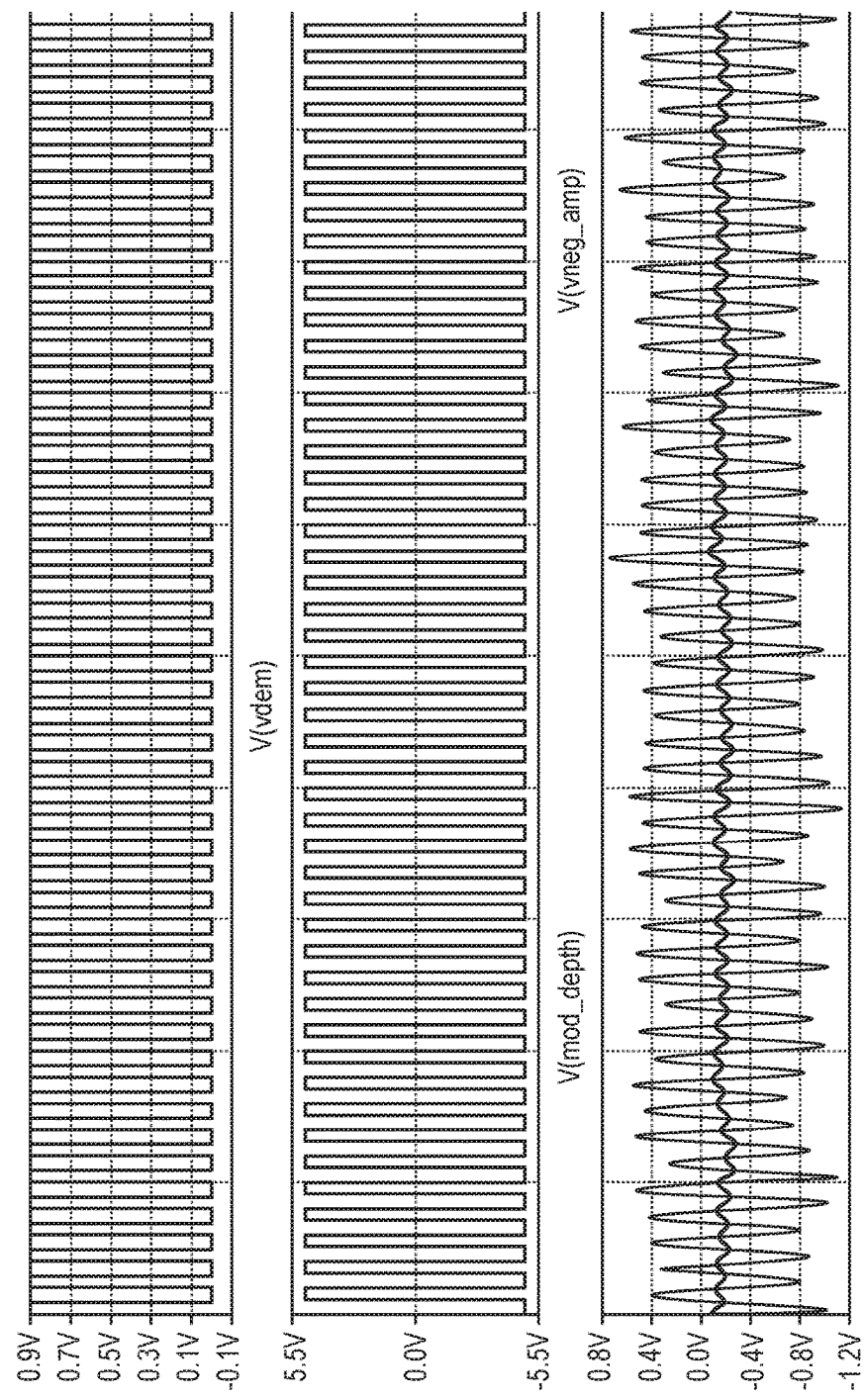

In the example the transmitter coil 103 and the receive coil 107 have a coupling factor equal to 0.04 and the power transfer signal frequency is set to 745 kHz. As shown in FIG. 21, if the phase offset between the reference signal and the measurement switch signal is equal to 0 degrees, and the measurement window is set to half the period of the carrier signal, the power transmitter will in the example correctly demodulate the received data.

Figure 22:
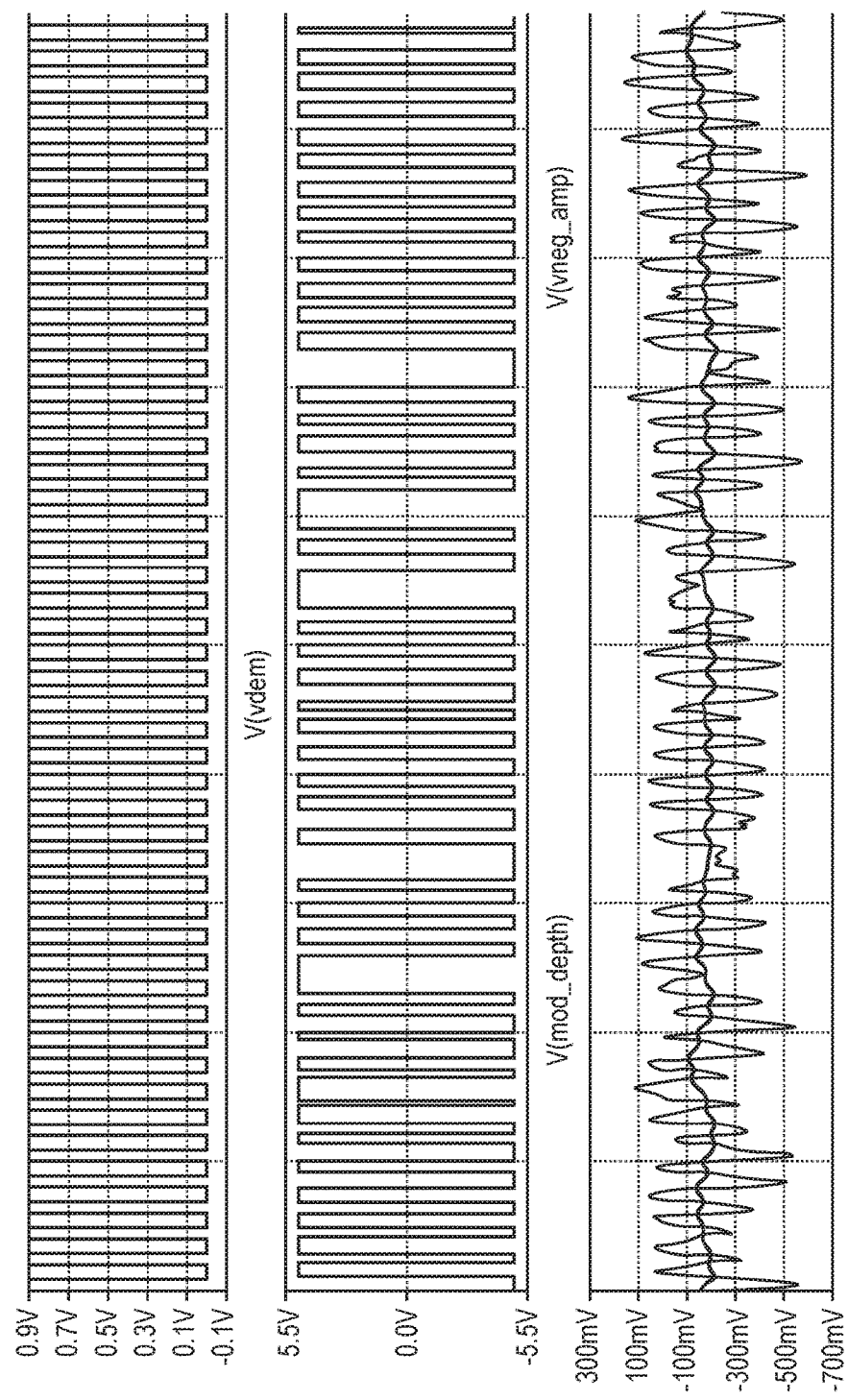
Figure 23:
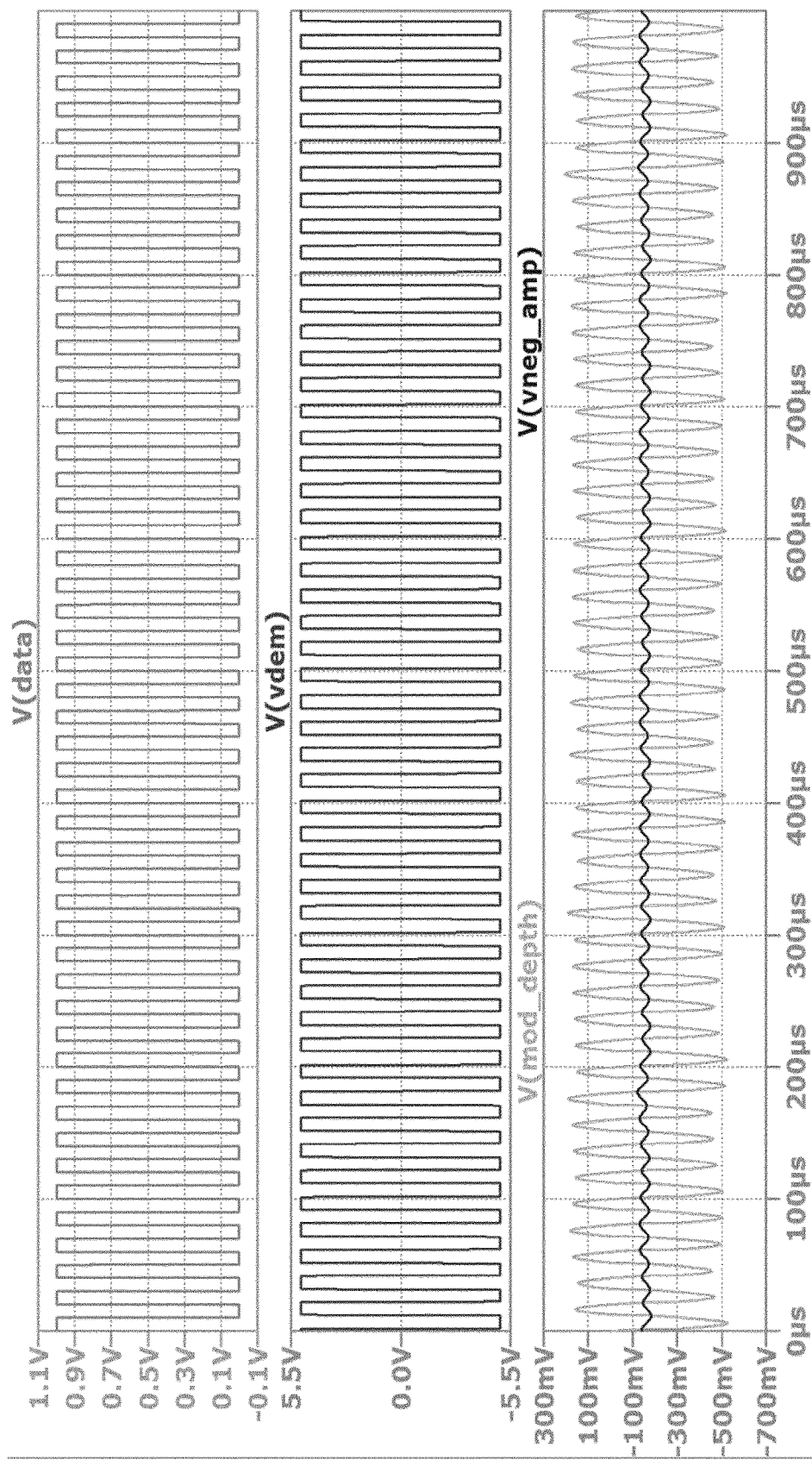

If the user moves the appliance slightly while cooking, the coupling between the two coils could be reduced, e.g. to 0.02. In this case, the situation of FIG. 22 arises and as can be seen the 0 degree phase offset will result in the data not being correctly demodulated. However, if the power transmitter adapts the measurement phase/timing offset (in the example by 45 degrees), the data is again correctly demodulated, as shown in FIG. 23. It should be noted that only the timing/phase offset has been adapted whereas the power transfer signal frequency has remained unchanged.

Figure 24:
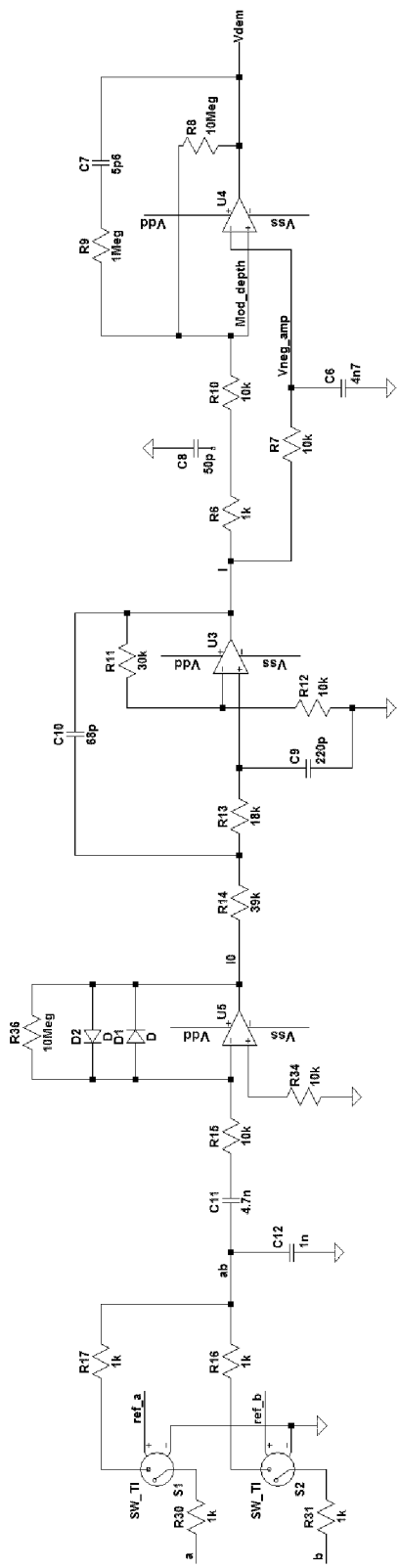
FIG. 24 illustrates an example of elements of a demodulation block for a power transmitter in accordance with some embodiments of the invention.
Figure 25:
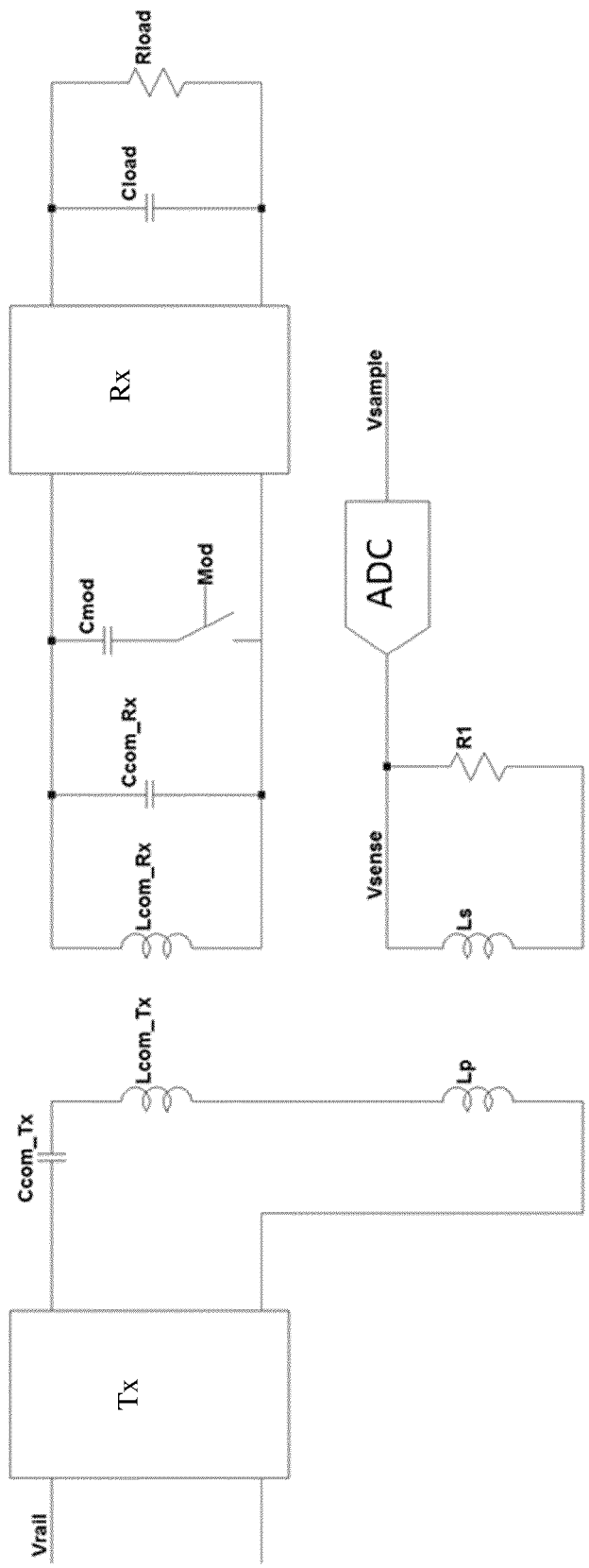
FIG. 25 illustrates an example of elements of a power transfer system in accordance with some embodiments of the invention.

FIG. 24 illustrates an example of an analog implementation of the circuit of FIG. 11. FIG. 25 illustrates an example of the system of FIG. 10 wherein the inductor current measurement is sampled by an Analog to Digital converter. The demodulator block 1005 may in this case be implemented digitally, e.g. as firmware in a microcontroller or digital signal processor. The measurement timing/phase offset may in this case be adapted by the microcontroller or digital signal processor by directly controlling the timing of the sampling by the Analog to Digital converter. In the example, the measurement window may be fixed (corresponding to a short sample interval).

The examples above focused on a high power application wherein a kitchen appliance is powered wirelessly. However, the described approach may be equally applicable to other applications, including low power applications such as for example applications corresponding to the Low Power Qi Specification (version 1.1)

In the following examples, the system of FIGS. 10 and 11 is again considered but with different design parameters. In the example, the transmitter coil 103 has an inductance value of 24 µH and the receive coil 107 has an inductance of 15.3 µH. Both coils have an equivalent series resistance of 200 mΩ. The resonance capacitors, Ccom_Tx and Ccom_Rx are set to 100 nF and 137 nF respectively. The modulation capacitor Cmod is set to 22 nF. Finally, a coupling of 0.4 is considered. This is a value that can typically be expected when a receiver is placed on top of a transmitter. This coupling value is much larger than the coupling factor value typically encountered in the previous high power application as the separation distance between the receiver and the transmitter is typically much smaller (e.g. a few mm).

Figure 26:
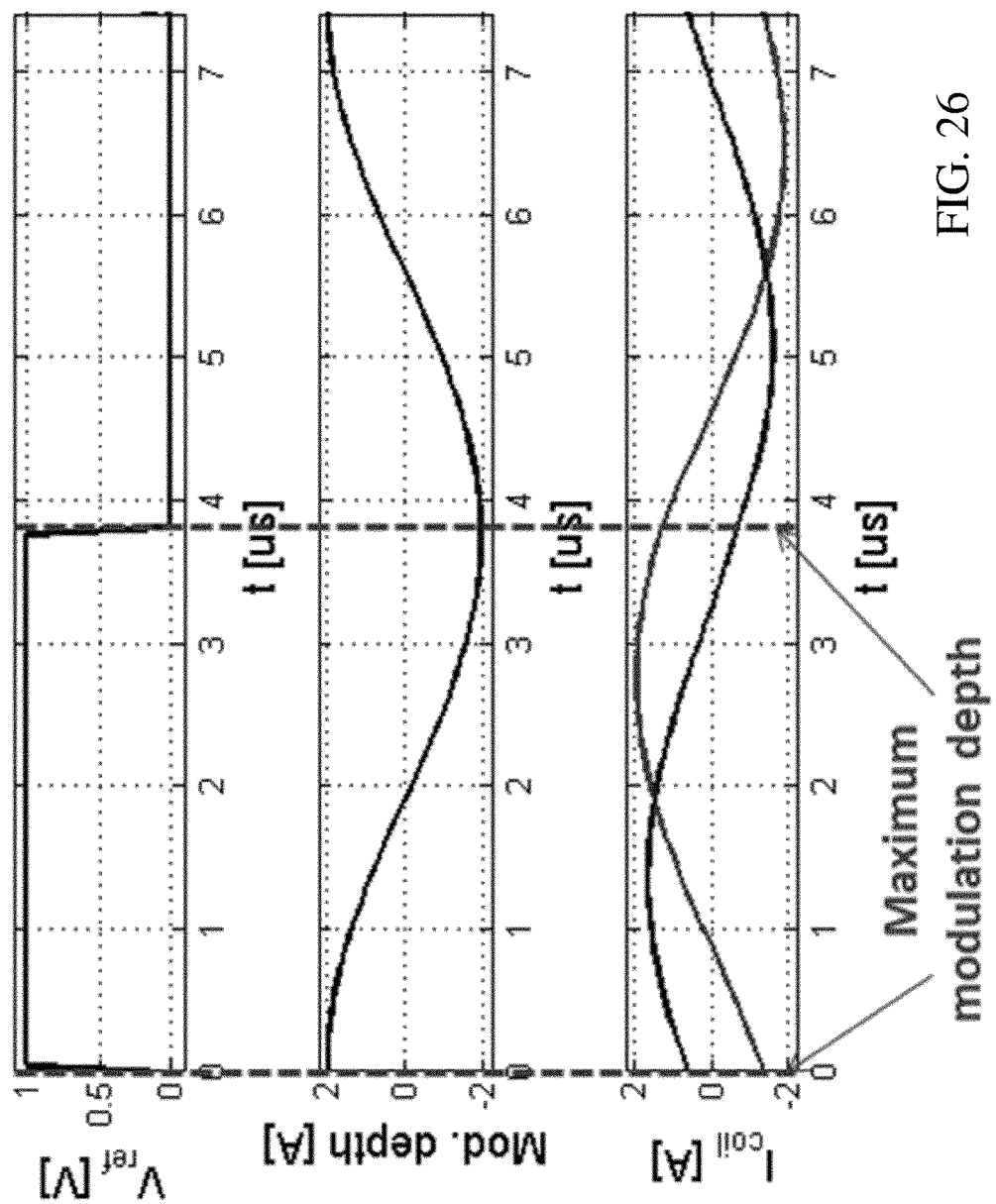
FIGS. 26-32 illustrate examples of operations of a power transfer system in accordance with some embodiments of the invention.
Figure 27:
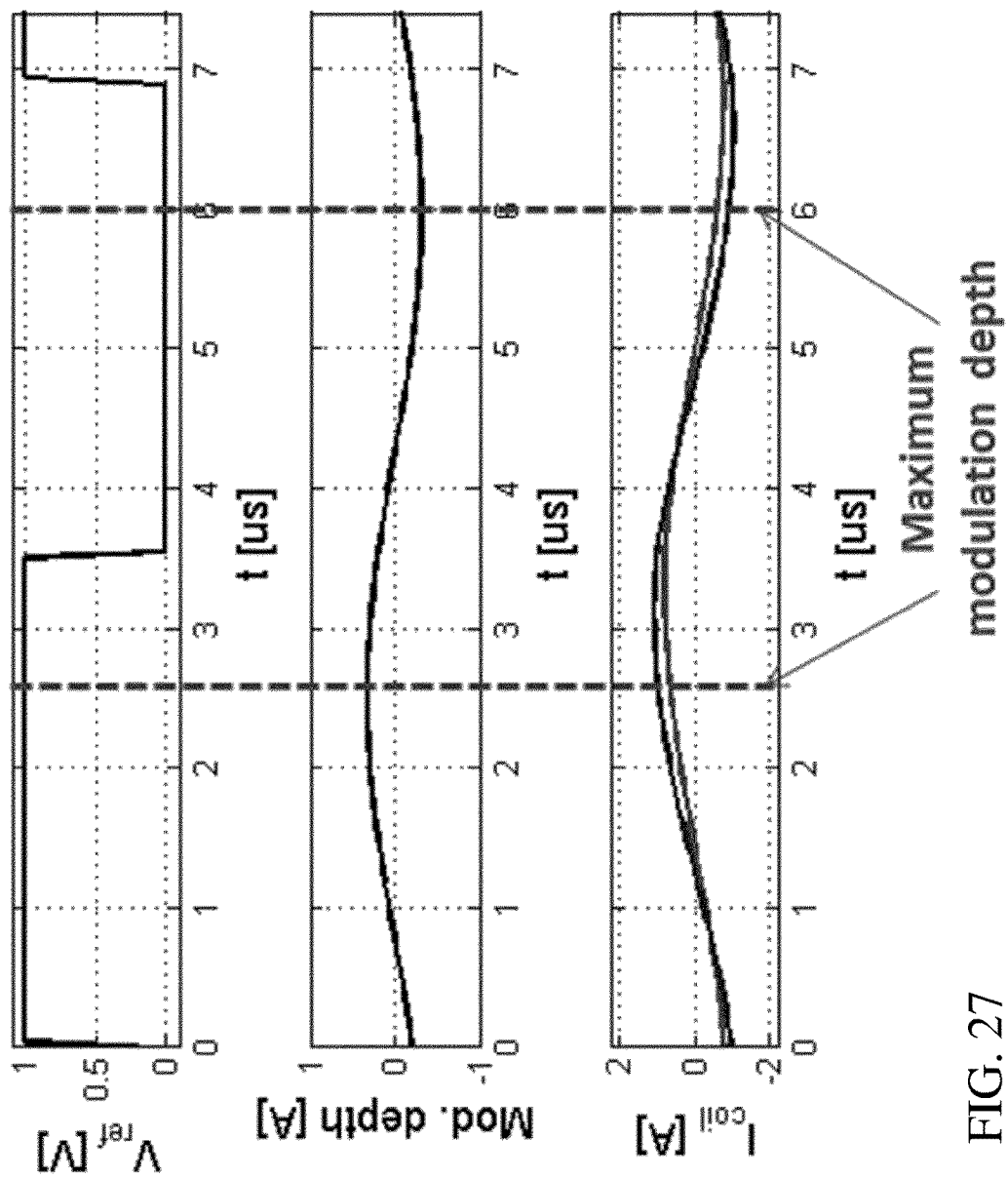

During the power transfer phase (i.e. transmitter providing power to the receiver), the power receiver provides information that may allow the power transmitter to control the power transferred to the receiver. Typically, the power transmitter controls the transmitted power by tuning its operating frequency (i.e. the frequency of the power transfer signal). FIG. 26 illustrates an example of the current flowing through the transmitter coil 103 (during one clock cycle) when the operating frequency is set to 135 kHz. The scenarios where the modulation capacitor is connected and disconnected are shown. As illustrated, the maximum demodulation depth occurs at each phase transition of the reference signal $V_{ref}$ which is also shown. In other words, the maximum modulation depth occurs at a 0 or 180 degrees phase of the reference signal If during the power transfer phase, the receiver requests less power, the power transmitter typically increases the operating frequency. FIG. 27 describes the current flowing through the transmitter coil 103 if the operating frequency is increased to 145 kHz. As shown, the maximum modulation depth now occurs after approximately 2.55 µs after each phase transition of the reference signal. In other words, the maximum modulation depth occurs at approximately a 133 or 313 degrees phase offset relative to the reference signal. It does not occur at the same instants in time as in FIG. 26.

Thus, as clearly illustrated the maximum demodulation/modulation depth depends on the frequency of the power transfer signal. In some embodiments, a change of frequency may be detected, and this detection may initiate an adaptation of the measurement timing/phase offset in order to support that the signal is demodulated at its optimal modulation depth.

Figure 28:
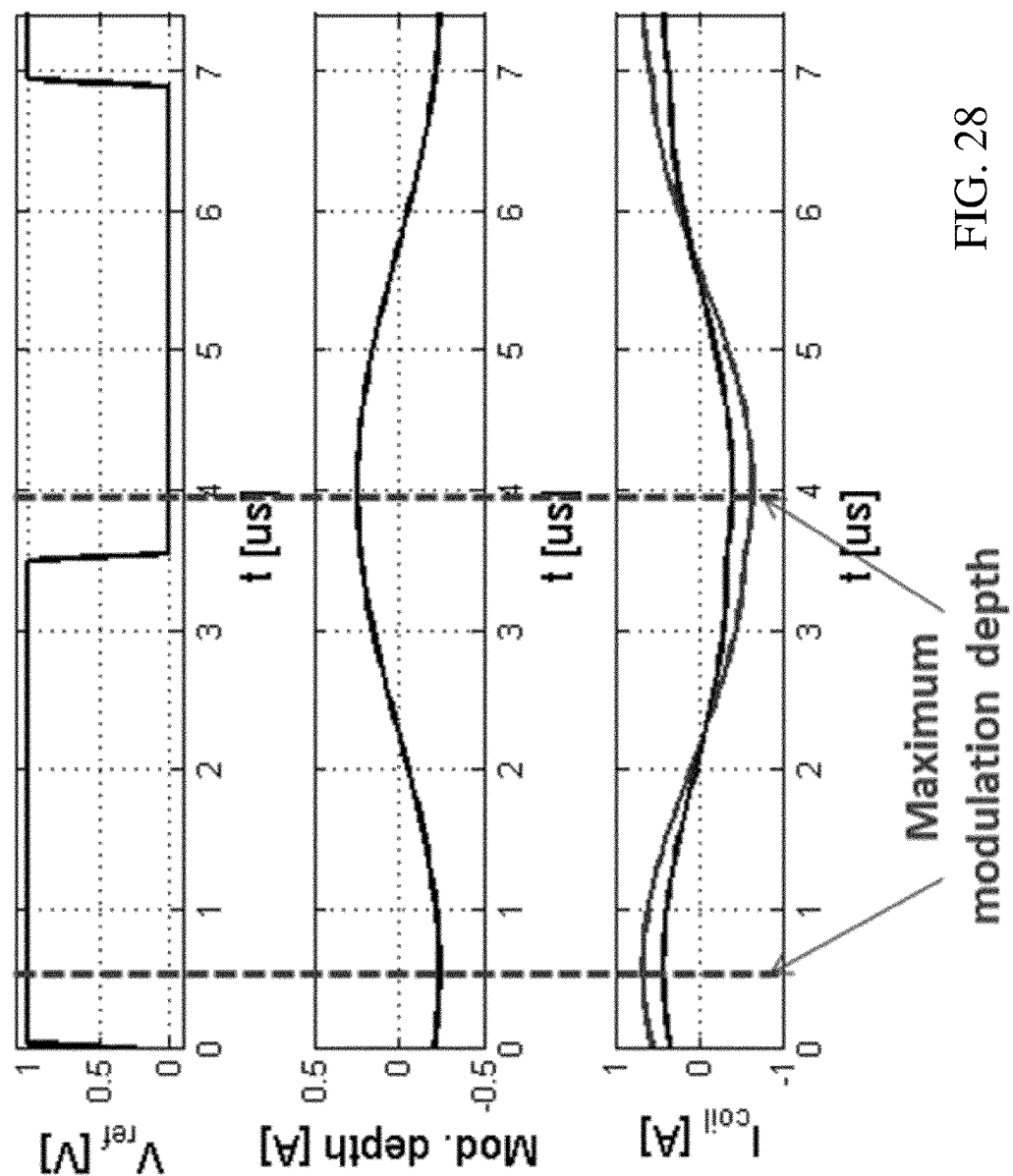

In the previous example, a coupling factor of 0.4 was considered. This coupling could vary. For example, if the position of the receiver on top of the transmitter is modified (intentionally or unintentionally) by the user, the coupling factor could increase or decrease. FIG. 28 illustrates the current flowing through the transmitter coil 103 if the coupling factor increases to 0.6 (operating frequency is set to 145 kHz, as in FIG. 27).

As shown, the maximum demodulation depth now occurs approximately 0.55 µs after each phase transition of the reference signal. In other words, the maximum modulation depth occurs at approximately at a 26 or 206 degrees phase offset relative to the reference signal. It does not occur at the same instants in time as in FIG. 27.

Thus, as clearly illustrated, the maximum demodulation/modulation depth depends on the coupling between the power transmitter and the power receiver. In some embodiments, a change of coupling may be detected, and this detection may initiate an adaptation of the measurement timing/phase offset in order to support that the signal is demodulated at its optimal modulation depth.

It should be noted that when the coupling factor varies, the inductance values of the primary and secondary coils also vary. This is for example due to the fact that more or less friendly metal in the receiver has influence on the magnetic flux generated by the primary coil. Thus, similar to the operating frequency or the coupling factor, these inductance variations do also have an effect on the instants in time (or phase) where the maximum modulation depth occurs.

As previously mentioned, the optimum measurement timing may also depend on the loading of the power transfer signal. FIGS. 29-32 illustrate the signals corresponding to FIGS. 21-23 but for the design parameters corresponding to the low power Qi example (i.e. to those of FIGS. 26-28).

Figure 29:
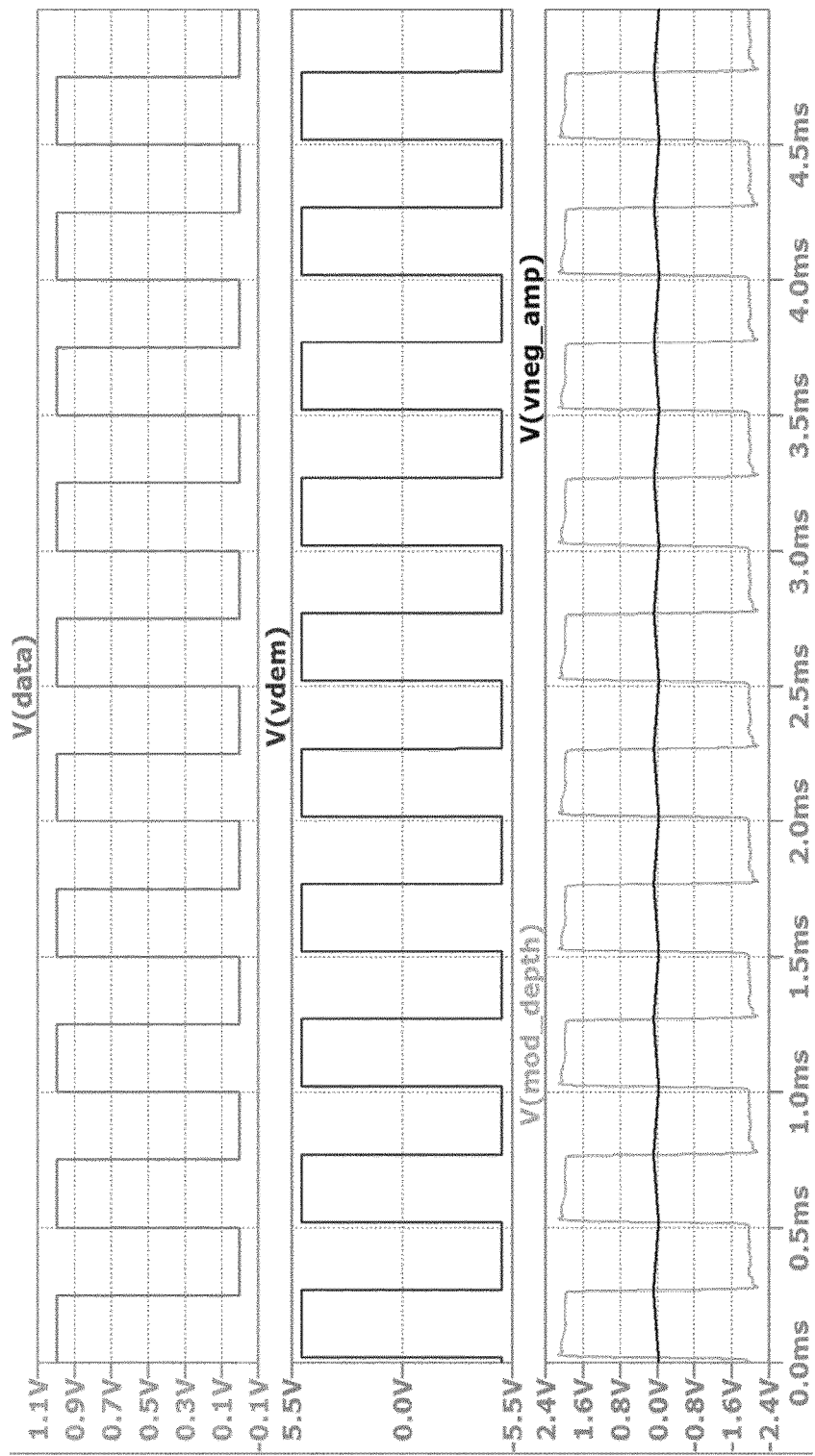

FIG. 29, illustrates an example for a load where the equivalent input impedance of the load is equal to 2 kΩ, and the operating frequency is set to 125 kHz. Typically, such a load may correspond to the internal microcontroller or microprocessor of the receiver. A 2 kΩ load corresponds to the equivalent input impedance of a microcontroller when in operation.

In the example, of FIG. 29, the phase/timing offset with respect to the reference signal is set to zero, and the measurement duration is set to half a time period. As can be seen the data is correctly demodulated.

Figure 30:
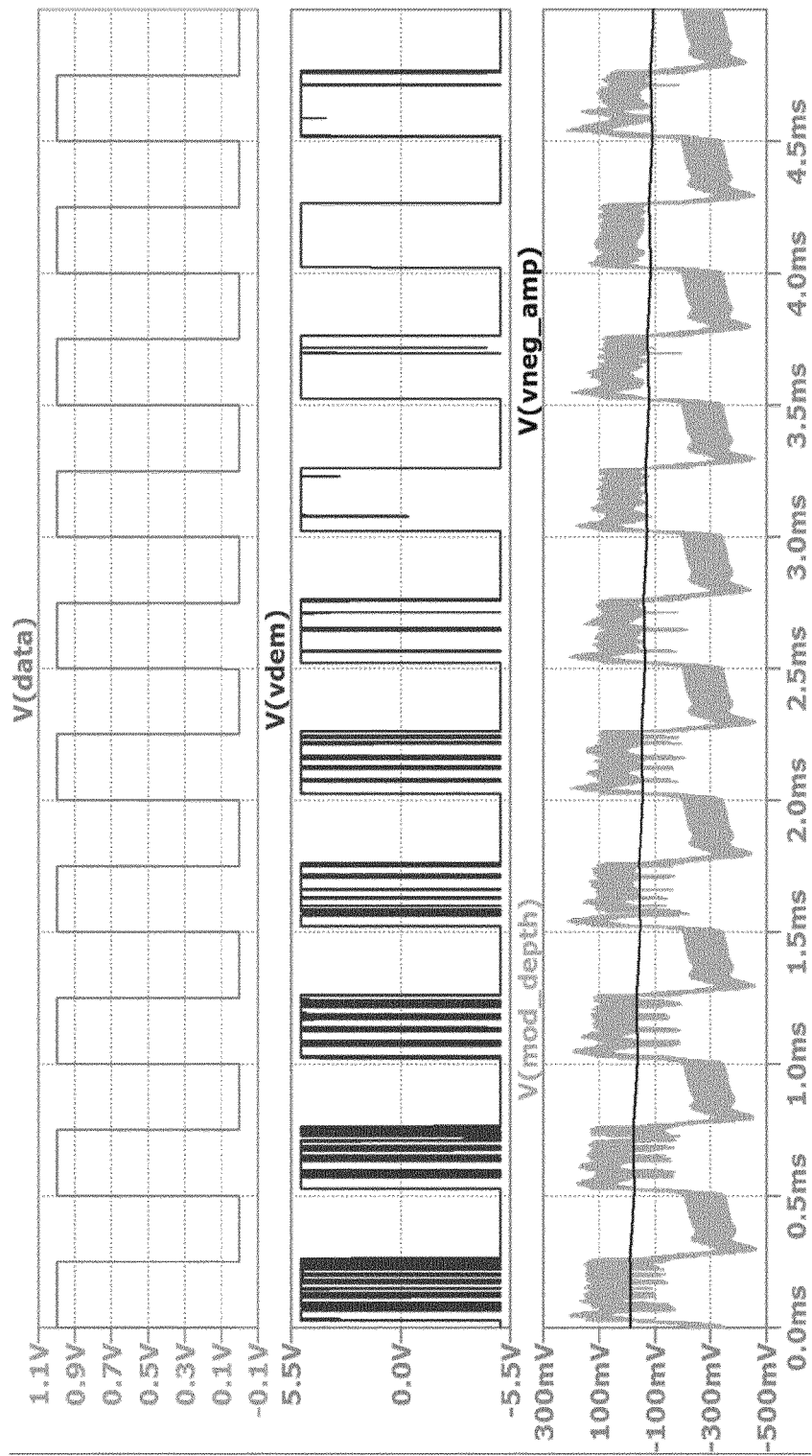

While e.g. being charged, the load impedance of the power receiver is not necessarily constant. As previously mentioned, the input impedance of the internal microcontroller has a value typically in the range of 1-2 kΩ. However, when the power transmitter starts e.g. charging the internal battery of the power receiver, the current flowing through it can typically reach 1 A. Thus, a load as small as 3.5Ω can be expected. If the load drops from 2 kΩ to 3.5Ω, an example such as shown in FIG. 30 can result if the same measurement parameters (i.e. phase/timing offset and duration) as for FIG. 29 are applied.

As illustrated, the data is no longer correctly demodulated correctly.

Figure 31:
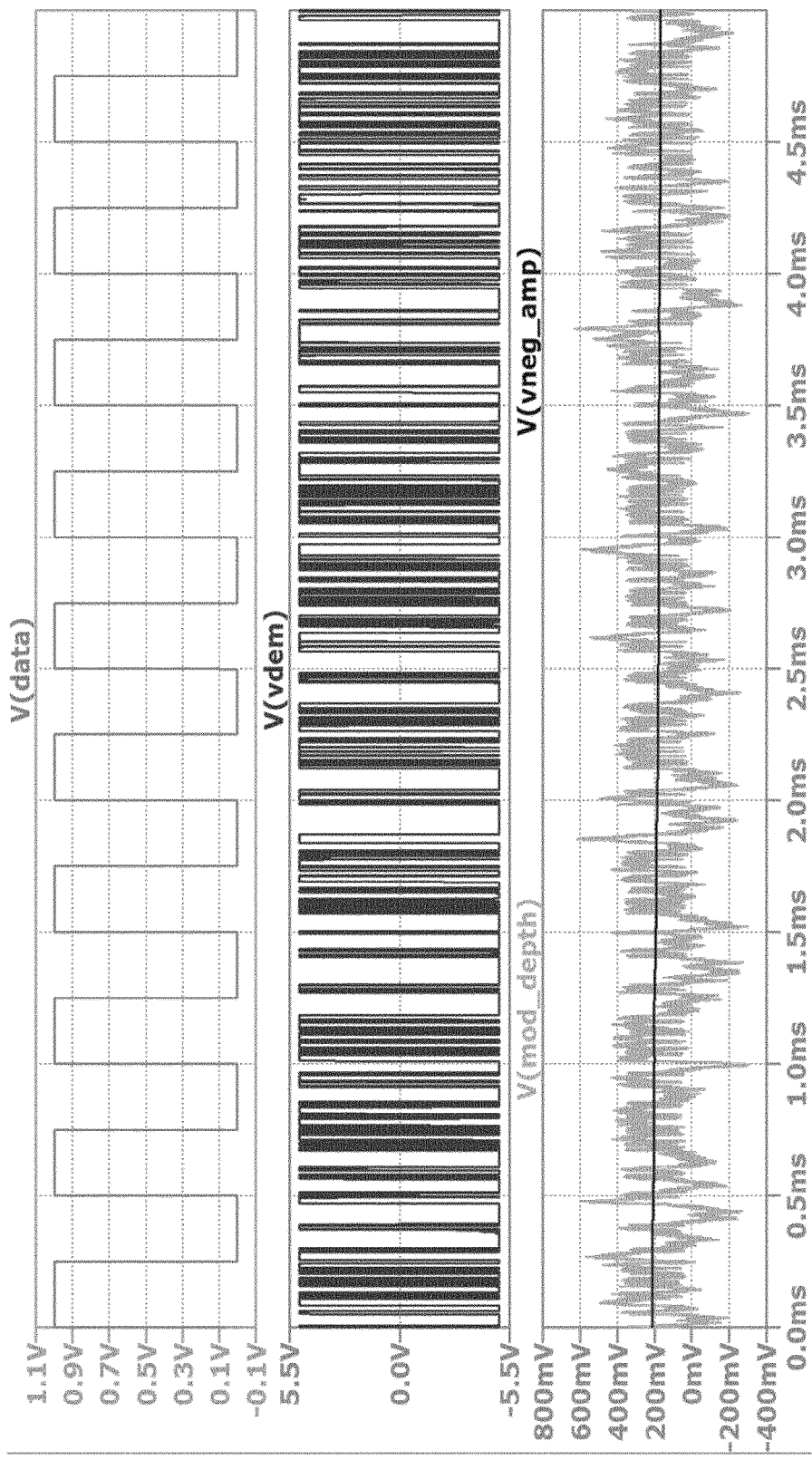
Figure 32:
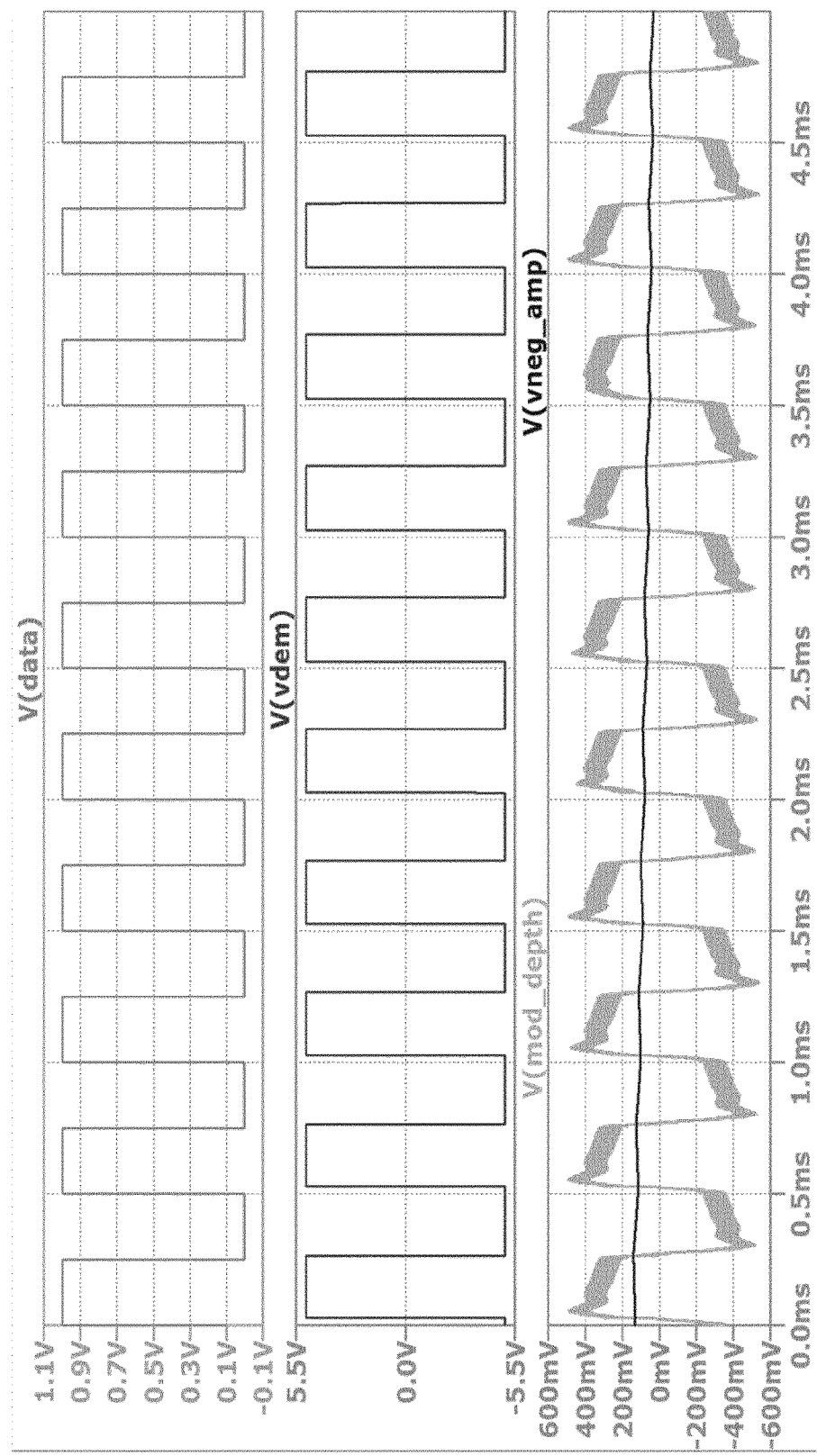

If the phase offset is instead modified to be 135 degrees, as illustrated in FIG. 31 the reliability of the communication is even worse. However, if it is modified to 45 degrees, the data is correctly demodulated by the power transmitter, as shown in FIG. 32.

Thus, as clearly illustrated, the maximum demodulation/modulation depth depends on the loading of the power transfer signal. In some embodiments, a change of loading may be detected, and this detection may initiate an adaptation of the measurement timing/phase offset in order to support that the signal is demodulated at its optimal modulation depth.

The previous description has focused on the often advantageous example wherein the power transfer signal is also used for load modulation, and thus where the power transfer signal also functions as an inductive carrier signal for load modulation by the power receiver.

However, in other embodiments, the communication by load modulation may be via a separate inductive carrier signal which e.g. may be generated by a different inductor, at different times and/or with different characteristics than the power transfer signal.

For example, in some embodiments, the power transmitter may comprise a power transfer inductor in addition to the transmitter inductor 103. This power transfer inductor may be driven by a power drive signal thereby generating the power transfer signal. The transmitter inductor 103 may be driven by a different drive signal thereby generating an inductive carrier signal which can be used for load modulation by the power receiver but which may not provide any, or only limited, power transfer capability.

It will be appreciated that the previously provided description and comments relating to generating and demodulating the power transfer signal applies equally to the scenario wherein an inductive carrier signal is generated that does not transfer power. For example, an inverter can be used to generate the drive signal which when fed to the transmitter inductor generates the inductive carrier signal. Specifically, the described approaches for adapting the demodulation (and specifically the measurement timing and durations) apply equally to the scenario wherein a second separate inductor provides a second inductive signal used for power transfer.

As an example, the power transmitter may comprise two coils/inductors, one for power and one for communication (the transmitter inductor 103). The two inductors may be individually driven by different, separate drive signals thereby individually generating the power transfer signal and the inductive carrier signal for load modulation respectively. These may both be generated as previously described, but may typically have different characteristics. Indeed, typically the characteristics for generating the power transfer signal is aimed at providing a high power transfer capability, and e.g. typically use a frequency of around 20-60 kHz. The communication coil (the transmitter inductor 103) is instead aimed at facilitating/optimizing communication at load modulation and is typically driven at a much higher frequency (usually in the several hundred kHz to MHz range). This may provide differentiation between the different signals and may improve communication reliability.

In some embodiments, the signals may also be time multiplexed. Specifically, time periods may be reserved for transferring power, and other time periods may be reserved for communication (i.e. the system may alternates between power transfer and communication intervals).

In such an embodiment, the inductive carrier signal may also be able to provide some (limited) power e.g. for the internal control logic of the power receiver.

In such a setup, the previously described approach for demodulation and in particular for adaptation of the demodulation approach may be applied to the communication inductor (i.e. to the transmitter inductor 103). Thus, the demodulation and adaptation may be based on measurements of the inductor voltage/current of the communication inductor in the same way as previously described for the combined case (i.e. where the inductive carrier signal is also the power transfer signal).

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for providing a power transfer to a power receiver using a wireless inductive power transfer signal, the power transmitter comprising:
   a transmitter inductor for generating an inductive carrier signal for load modulation in response to a voltage drive signal applied to at least one of the transmitter inductor and a resonance circuit comprising the transmitter inductor;
   a measurement unit arranged to, for cycles of a reference signal synchronized to the voltage drive signal, perform first measurements of at least one of an inductor current and an inductor voltage for the transmitter inductor, each first measurement being over a measurement time interval being a subset of a cycle period of the reference signal and having a first time offset relative to the reference signal;
   an adaptor for varying the first time offset and detecting an optimum measurement timing offset for the varying first time offset, the optimum measurement timing offset being detected as a time offset for the varying first time offset which results in a maximum demodulation depth for a demodulation depth reflecting a difference measure for first measurements generated by the measurement unit with the first time offset for different modulation loads of the inductive carrier signal; and
   a demodulator for demodulating load modulation of the inductive carrier signal from first measurements with the first time offset set to the optimum measurement timing offset.

2. The power transmitter of claim 1 wherein the adaptor is arranged to vary a duration of the measurement time interval to determine an optimum measurement duration resulting in a maximum demodulation depth; and
   the demodulator is arranged to demodulate the load modulation from first measurements with a duration of the measurement time interval corresponding to the optimum measurement duration.

3. The power transmitter of claim 1, wherein the first measurements are of the inductor current, and
   the measurement unit is further arranged to, for cycles of the reference signal, perform second measurements of the inductor voltage, each second measure being in a second measurement time interval being a subset of the cycle period of the reference signal and having a second time offset relative to the reference signal;
   the adaptor is arranged to vary the second time offset to determine a second optimum measurement timing offset resulting in a second maximum demodulation depth for a demodulation depth reflecting a difference measure for second measurements for different modulation loads of the inductive carrier signal; and
   the demodulator is arranged to demodulate the load modulation from second measurements with the second time offset set to the second optimum measurement timing offset.

4. The power transmitter of claim 1, wherein the measurement unit is arranged to generate first measurements of the inductor current and the inductor voltage with different time offsets relative to the reference signal, and the demodulator is arranged to demodulate the load modulation from both measurements of the inductor current and the inductor voltage.

5. The power transmitter of claim 1 wherein the reference signal is one of the voltage drive signal and a drive signal for a switch circuit generating the voltage drive signal.

6. The power transmitter of claim 1 wherein the inductive carrier signal is the power transfer signal.

7. The power transmitter of claim 6 further comprising a power transfer adapter arranged to select a frequency of the power transfer signal based on a power transfer property.

8. The power transmitter of claim 7 wherein the power transfer adapter is arranged to vary the frequency of the power transfer signal in response to power control messages received from the power receiver.

9. The power transmitter of claim 1 wherein the power transfer adapter is arranged to initiate a determination of the optimum measurement timing offset in response to a change of the frequency of the inductive carrier signal.

10. The power transmitter of claim 1 wherein the measurement unit is arranged to, for each first measurement, perform within the same cycle of the reference signal, a second measurement of at least one of the inductor current and the inductor voltage, the second measurement being in measurement time intervals having a timing corresponding to the measurement time intervals for the first measurements but with a time offset half shifted by half the cycle period offset relative to the measurement time intervals of the first measurements; and the demodulator is arranged to demodulate the load modulation from both the first measurements and the second measurements.

11. The power transmitter of claim 1 wherein the first measurements are of the inductor current of the transmitter inductor.

12. The power transmitter of claim 1 wherein the adapter is arranged to initiate a determination of the optimum measurement timing offset in response to a detection of a change in a loading of the inductive carrier signal.

13. The power transmitter of claim 1 wherein the adapter is arranged to initiate a determination of the optimum measurement timing offset in response to a detection of a change in a coupling between the power transmitter and the power receiver.

14. A method of operation for a power transmitter arranged to provide a power transfer to a power receiver using a wireless inductive power transfer signal, the method comprising:
   a transmitter inductor generating an inductive carrier signal for load modulation in response to a voltage drive signal applied to at least one of the transmitter inductor and a resonance circuit comprising the transmitter inductor;
   for cycles of a reference signal synchronized to the voltage drive signal, performing first measurements of at least one of an inductor current and an inductor voltage for the transmitter inductor, each first measurement being over a measurement time interval being a subset of a cycle period of the reference signal and having a first time offset relative to the reference signal;
   varying the first time offset and detecting an optimum measurement timing offset as a time offset for the varying first time offset which results in a maximum demodulation depth for a demodulation depth reflecting a difference measure for first measurements generated with the first time offset for different modulation loads of the inductive carrier signal; and demodulating load modulation of the inductive carrier signal from first measurements with the first time offset set to the optimum measurement timing offset.

* * * * *